United States Patent
Gildert et al.

(10) Patent No.: US 12,122,040 B2
(45) Date of Patent: *Oct. 22, 2024

(54) HAPTIC PHOTOGRAMMETRY IN ROBOTS AND METHODS FOR OPERATING THE SAME

(71) Applicant: Sanctuary Cognitive Systems Corporation, Vancouver (CA)

(72) Inventors: Suzanne Gildert, Vancouver (CA); Olivia Norton, North Vancouver (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,219

(22) Filed: Jun. 8, 2023

(65) Prior Publication Data

US 2023/0405835 A1 Dec. 21, 2023

Related U.S. Application Data

(63) Continuation of application No. 18/092,157, filed on Dec. 30, 2022, now Pat. No. 11,717,974.

(Continued)

(51) Int. Cl.
*B25J 9/16* (2006.01)
*B25J 13/08* (2006.01)
*B25J 19/02* (2006.01)

(52) U.S. Cl.
CPC .......... *B25J 13/084* (2013.01); *B25J 9/1697* (2013.01); *B25J 13/089* (2013.01); *B25J 19/023* (2013.01)

(58) Field of Classification Search
CPC . B25J 9/163; B25J 9/162; B25J 9/1697; B25J 13/02; Y10S 901/01; Y10S 901/03; Y10S 901/28
See application file for complete search history.

(56) References Cited

U.S. PATENT DOCUMENTS

| | | | |
|---|---|---|---|
| 10,481,571 B2* | 11/2019 | Matsushima | G05B 19/4061 |
| 10,540,779 B2* | 1/2020 | Shih | G06T 7/70 |

(Continued)

FOREIGN PATENT DOCUMENTS

| | | |
|---|---|---|
| CN | 110060284 A | 7/2019 |
| WO | 2019021058 A2 | 1/2019 |

(Continued)

OTHER PUBLICATIONS

International Search Report of International Application No. PCT/CA2023/050786 (Aug. 14, 2023).

*Primary Examiner* — Dalena Tran
(74) *Attorney, Agent, or Firm* — Thomas Mahon; Adenike Adebiyi

(57) ABSTRACT

Robots, robot systems, and methods for operating the same based on environment models including haptic data are described. An environment model which includes representations of objects in an environment is accessed, and a robot system is controlled based on the environment model. The environment model incudes haptic data, which provides more effective control of the robot. The environment model is populated based on visual profiles, haptic profiles, and/or other data profiles for objects or features retrieved from respective databases. Identification of objects or features can be based on cross-referencing between visual and haptic profiles, to populate the environment model with data not directly collected by a robot which is populating the model, or data not directly collected from the actual objects or features in the environment.

20 Claims, 7 Drawing Sheets

Related U.S. Application Data

(60) Provisional application No. 63/351,274, filed on Jun. 10, 2022.

(56) References Cited

U.S. PATENT DOCUMENTS

| 11,282,233 B1* | 3/2022 | Momcilovic | G06T 7/80 |
| 2020/0130193 A1* | 4/2020 | Takahashi | G06N 3/08 |
| 2020/0130963 A1* | 4/2020 | Diankov | G06T 7/001 |

FOREIGN PATENT DOCUMENTS

| WO | 2019028269 A2 | 2/2019 |
| WO | 2020047120 A1 | 3/2020 |

* cited by examiner

HAPTIC PHOTOGRAMMETRY IN ROBOTS AND METHODS FOR OPERATING THE SAME

TECHNICAL FIELD

The present robots, robot systems, and methods generally relate to controlling operation of said robots or robot systems, and particularly relate to robots that are capable of at least semi-autonomously operating within an environment.

DESCRIPTION OF THE RELATED ART

Robots are machines that may be deployed to perform work. General purpose robots (GPRs) can be deployed in a variety of different environments, to achieve a variety of objectives or perform a variety of tasks. A robot utilizes an environment model to operate within an environment. However, such environment models are prone to incomplete information that results in non-optimal performance of a robot in the environment.

BRIEF SUMMARY

According to a broad aspect, the present disclosure describes a method of operation of a robot, the robot comprising at least one processor and at least one haptic sensor, the method comprising: accessing, by the at least one processor of the robot, an environment model representing an environment, the environment model comprising haptic data including at least one haptic profile of at least one object in the environment; controlling, by the at least one processor, the robot based at least in part on the haptic data included in the environment model and based on feedback from the at least one haptic sensor.

The method may further comprise generating, by the at least one processor, the environment model based at least in part on haptic data collected by the at least one haptic sensor.

Accessing, by the at least one processor, an environment model may comprise: accessing, by the at least one processor, the environment model as generated by another device based at least in part on haptic data collected by at least one haptic sensor of the other device. The other device may comprise another robot operable in the environment.

The environment model may further include visual data representing the environment, the visual data including at least one visual profile of at least one object in the environment; and controlling, by the at least one processor, the robot may be further based at least in part on the visual data included in the environment model.

The method may further comprise: in response to controlling the robot, refining the environment model based on further haptic data collected by the at least one haptic sensor.

The robot may include at least one actuatable end effector; the at least one haptic sensor of the robot may include at least one haptic sensor positioned on a first actuatable end effector of the at least one actuatable end effector; and the method may further comprise touching, by the first actuatable end effector, a first object of the at least one object. The method may further comprise: capturing, by the at least one haptic sensor positioned on the first actuatable end effector, haptic feedback from the first object; determining a haptic profile of the first object based on the haptic feedback from the first object; and determining an identification of the first object by matching the determined haptic profile to a reference haptic profile in a database of haptic profiles. The method may further comprise: accessing a visual profile corresponding to the first object in a database of visual profiles, based on the identification of the first object. The method may further comprise: populating the environment model with a visual representation of the first object based on the accessed visual profile.

Determining a haptic profile of the first object may comprise determining the haptic profile of the first object by the at least one processor of the robot; determining an identification of the first object may comprise determining the identification of the first object by the at least one processor of the robot; accessing a visual profile corresponding to the first object in a database of visual profiles may comprise accessing the visual profile by the at least one processor of the robot; and populating the environment model with a visual representation of the first object may comprise populating the environment model by the at least one processor of the robot. Determining a haptic profile of the first object may comprise determining the haptic profile of the first object by the at least one processor of the robot; the method may further comprise sending the determined haptic profile by a communication interface of the robot, to be received by a remote device; determining an identification of the first object may comprise determining the identification of the first object by at least one processor of the remote device; accessing a visual profile corresponding to the first object in a database of visual profiles may comprise accessing the visual profile by the at least one processor of the remote device; the method may further comprise sending the accessed visual profile by a communication interface of the remote device, to be received by the robot; and populating the environment model with a visual representation of the first object may comprise populating the environment model by the at least one processor of the robot. The method may further comprise sending, by a communication interface of the robot, the haptic feedback data from the first object to be received by a remote device; determining a haptic profile of the first object may comprise determining the haptic profile of the first object by at least one processor of the remote device; determining an identification of the first object may comprise determining the identification of the first object by the at least one processor of the remote device; accessing a visual profile corresponding to the first object in a database of visual profiles may comprise accessing the visual profile by the at least one processor of the remote device; and populating the environment model with a visual representation of the first object may comprise populating the environment model by the at least one processor of the remote device.

The method may further comprise updating the reference haptic profile in the database of haptic profiles based on the haptic feedback from the first object. The method may further comprise: populating the environment model with a haptic representation of the first object based on the determined haptic profile. The method may further comprise: populating the environment model with a haptic representation of the first object based on the reference haptic profile.

The robot may include at least one actuatable end effector; the at least one haptic sensor of the robot may include at least one haptic sensor positioned on a first actuatable end effector of the at least one actuatable end effector; and the method may further comprise: touching, by the first actuatable end effector, a first object of the at least one object; determining a haptic profile of the first object based on the haptic feedback from the first object; and providing the determined haptic profile to a database of haptic profiles. Determining the haptic profile of the first object may comprise: determining the haptic profile by the at least one processor of the robot; and providing the determined haptic profile to a database of haptic profiles may comprise: sending, by a communication interface of the robot, the determined haptic profile to a remote device which stores the database of haptic profiles. The method may further comprise sending, by a communication interface of the robot, the haptic feedback for the first object to be received by a remote device; determining the haptic profile of the first object may comprise: determining, by at least one processor of the remote device, the haptic profile; and providing the haptic profile to a database of haptic profiles may comprise: storing the determined haptic profile in the database of haptic profiles stored on a non-transitory processor-readable storage medium of the remote device.

The robot may include at least one visual sensor; and the method may further comprise capturing, by the at least one visual sensor, visual data representing a first object of the at least one object. The method may further comprise: determining a visual profile of the first object based on the visual data representing the first object; and determining an identification of the first object by matching the determined visual profile to a reference visual profile in a database of visual profiles. The method may further comprise: accessing a haptic profile corresponding to the first object in a database of haptic profiles, based on the identification of the first object. The method may further comprise: populating the environment model with a haptic representation of the first object based on the accessed haptic profile.

Determining a visual profile of the first object may comprise determining the visual profile of the first object by the at least one processor of the robot; determining an identification of the first object may comprise determining the identification of the first object by the at least one processor of the robot; accessing a haptic profile corresponding to the first object in a database of haptic profiles may comprise accessing the haptic profile by the at least one processor of the robot; and populating the environment model with a haptic representation of the first object may comprise populating the environment model by the at least one processor of the robot. Determining a visual profile of the first object comprises determining the visual profile of the first object by the at least one processor of the robot; the method may further comprise sending the determined visual profile by a communication interface of the robot, to be received by a remote device; determining an identification of the first object may comprise determining the identification of the first object by at least one processor of the remote device; accessing a haptic profile corresponding to the first object in a database of haptic profiles may comprise accessing the haptic profile by the at least one processor of the remote device; the method may further comprise sending the accessed haptic profile by a communication interface of the remote device, to be received by the robot; and populating the environment model with a haptic representation of the first object may comprise populating the environment model by the at least one processor of the robot. The method may further comprise sending, by a communication interface of the robot, the visual data representing the first object to be received by a remote device; determining a visual profile of the first object may comprise determining the visual profile of the first object by at least one processor of the remote device; determining an identification of the first object may comprise determining the identification of the first object by the at least one processor of the remote device; accessing a haptic profile corresponding to the first object in a database of haptic profiles may comprise accessing the haptic profile by the at least one processor of the remote device; and populating the environment model with a haptic representation of the first object may comprise populating the environment model by the at least one processor of the remote device.

The method may further comprise: populating the environment model with a visual representation of the first object based on the determined visual profile. The method may further comprise: populating the environment model with a visual representation of the first object based on the reference visual profile.

The robot may include at least one locomotion member; the at least one haptic sensor of the robot may include at least one haptic sensor positioned on the at least one locomotion member; and the method may further comprise accessing a haptic profile of a support surface in the environment. The method may further comprise: planning a motion path on the support surface for the robot based on the haptic profile of the support surface; and executing, by the at least one locomotion member, the motion path on the support surface. The method may further comprise revising the motion path on the support surface based on haptic feedback captured by the at least one haptic sensor on the at least one locomotion member during execution of the motion path on the support surface. The method may further comprise: capturing, by the at least one haptic sensor, haptic feedback from a region of the support surface on which the at least one locomotion member is positioned; determining a haptic profile of the support surface based on the haptic feedback; and matching the determined haptic profile to a reference haptic profile in a database of haptic profiles, and accessing a haptic profile of the support surface may comprise accessing the reference haptic profile. The robot may include at least one visual sensor, and the method may further comprise: capturing, by the at least one visual sensor, visual data representing the support surface; determining a visual profile of the support surface based on the visual data representing the support surface; and determining an identification of the support surface by matching the determined visual profile to a reference visual profile in a database of visual profiles, and accessing a haptic profile of the support surface may comprise accessing a haptic profile corresponding to the support surface in a database of haptic profiles based on the identification of the support surface.

The method may further comprise: touching, by the robot with the at least one haptic sensor, at least one object in the environment; activating the at least one haptic sensor in response to touching the at least one object; capturing, by the at least one haptic sensor, haptic data of the at least one object in response to activating the at least one haptic sensor.

The haptic data included in the environmental model may be used by the at least one processor prior to the at least one processor processing feedback from the at least one haptic sensor.

According to another broad aspect, the present disclosure describes a robot system comprising: a robot body; at least one processor; at least one haptic sensor carried by the robot body; at least one non-transitory processor-readable storage medium communicatively coupled to the at least one processor, the at least one non-transitory processor-readable storage medium storing processor-executable instructions or data that, when executed by the at least one processor, cause the robot system to: access, by the at least one processor, an environment model representing an environment, the environment model comprising haptic data including at least one haptic profile of at least one object in the environment; control, by the at least one processor, the robot body based at least in part on the haptic data included in the environment model and based on feedback from the at least one haptic sensor.

The processor executable instructions or data may cause the robot system to generate, by the at least one processor, the environment model based at least in part on haptic data collected by the at least one haptic sensor.

The processor-executable instructions or data which cause the robot system to access, by the at least one processor, the environment model may cause the robot system to: access, by the at least one processor, the environment model as generated by another device based at least in part on haptic data collected by at least one haptic sensor of the other device. The other device may comprise another robot body operable in the environment.

The environment model may further include visual data representing the environment, the visual data including at least one visual profile of at least one object in the environment; and the processor-executable instructions or data which cause the robot system to control, by the at least one processor, the robot system may cause the at least one processor to: control the robot system further based at least in part on the visual data included in the environment model.

The processor-executable instructions or data may further cause the robot system to: in response to the at least one processor controlling the robot system, refine the environment model based on further haptic data collected by the at least one haptic sensor.

The robot body may comprise at least one actuatable end effector; the at least one haptic sensor of the robot system may include at least one haptic sensor positioned on a first actuatable end effector of the at least one actuatable end effector; and the processor-executable instructions or data may further cause the robot system to touch, by the first actuatable end effector, a first object of the at least one object. The first actuatable end effector may comprise a hand member. The processor-executable instructions or data may further cause the robot system to: capture, by the at least one haptic sensor positioned on the first actuatable end effector, haptic feedback from the first object; determine a haptic profile of the first object based on the haptic feedback from the first object; and determine an identification of the first object by matching the determined haptic profile to a reference haptic profile in a database of haptic profiles. The processor-executable instructions or data may further cause the robot system to: access a visual profile corresponding to the first object in a database of visual profiles, based on the identification of the first object. The processor-executable instructions or data may further cause the robot system to: populate the environment model with a visual representation of the first object based on the accessed visual profile.

The at least one processor may include at least one processor carried by the robot body; the processor-executable instructions or data which cause the robot system to determine a haptic profile of the first object may cause the at least one processor carried by the robot body to determine the haptic profile of the first object; the processor-executable instructions or data which cause the robot system to determine an identification of the first object may cause the at least one processor carried by the robot body to determine the identification of the first object; the processor-executable instructions or data which cause the robot system to access a visual profile corresponding to the first object in a database of visual profiles may cause the at least one processor carried by the robot body to access the visual profile; and the processor-executable instructions or data which cause the robot system to populate the environment model with a visual representation of the first object may cause the at least one processor carried by the robot body to populate the environment model. The at least one processor may include at least one first processor carried by the robot body and at least one second processor positioned at a remote device separate from the robot body; the robot system may comprise a first communication interface carried by the robot body and a second communication interface positioned at the remote device; the processor-executable instructions or data which cause the robot system to access, by the at least one processor, an environment model representing an environment, may cause the at least one first processor to access the environment model; the processor-executable instructions or data which cause the robot system to control, by the at least one processor, the robot system may cause the at least one first processor to control the robot system; the processor-executable instructions or data which cause the robot system to determine a haptic profile of the first object may cause the at least one first processor to determine the haptic profile of the first object; the processor-executable instructions or data may cause the first communication interface to send the determined haptic profile, to be received by the second communication interface; the processor-executable instructions or data which cause the robot system to determine an identification of the first object may cause the at least one second processor to determine the identification of the first object; the processor-executable instructions or data which cause the robot system to access a visual profile corresponding to the first object in a database of visual profiles may cause the at least one second processor to access the visual profile; the processor-executable instructions or data may cause the second communication interface to send the accessed visual profile, to be received by the first communication interface; and the processor-executable instructions or data which cause the robot system to populate the environment model with a visual representation of the first object may cause the at least one first processor to populate the environment model. The at least one processor may include at least one first processor carried by the robot body and at least one second processor positioned at a remote device separate from the robot body; the robot system may comprise a first communication interface carried by the robot body and a second communication interface positioned at the remote device; the processor-executable instructions or data which cause the robot system to access, by the at least one processor, an environment model representing an environment, may cause the at least one first processor to access the environment model; the processor-executable instructions or data which cause the robot system to control, by the at least one processor, the robot system may cause the at least one first processor to control the robot system; the processor-executable instructions or data may cause the first communication interface to send the haptic feedback data from the first object to be received by the second communication interface; the processor-executable instructions or data which cause the robot system to determine a haptic profile of the first object may cause the at least one second processor to determine the haptic profile of the first object; the processor-executable instructions or data which cause the robot system to determine an identification of the first object may cause the at least one second processor to determine the identification of the first object; the processor-executable instructions or data which cause the robot system to access a visual profile corresponding to the first object in a database of visual profiles may cause the at least one second processor to access the visual profile; and the processor-executable instructions or data which cause the robot system to populate the environment model with a visual representation of the first object may cause the at least one second processor to populate the environment model.

The processor-executable instructions or data may further cause the robot system to update the reference haptic profile in the database of haptic profiles based on the haptic feedback from the first object. The processor-executable instructions or data may further cause the robot system to: populate the environment model with a haptic representation of the first object based on the determined haptic profile. The processor-executable instructions or data may further cause the robot system to: populate the environment model with a haptic representation of the first object based on the reference haptic profile.

The robot body may comprises at least one actuatable end effector; the at least one haptic sensor of the robot system may include at least one haptic sensor positioned on a first actuatable end effector of the at least one actuatable end effector; and the processor-executable instructions or data may further cause the robot system to: touch, by the first actuatable end effector, a first object of the at least one object; determine a haptic profile of the first object based on the haptic feedback from the first object; and provide the determined haptic profile to a database of haptic profiles.

The at least one processor may include at least one processor carried by the robot body; the robot system may comprise a communication interface carried by the robot body; the processor-executable instructions which cause the robot system to determine the haptic profile of the first object may cause the robot system to: determine the haptic profile by the at least one processor carried by the robot body; and the processor-executable instructions which cause the robot system to provide the determined haptic profile to a database of haptic profiles may cause the robot system to: send, by the communication interface carried by the robot body, the determined haptic profile to a remote device which stores the database of haptic profiles. The at least one processor may include at least one first processor carried by the robot body and at least one second processor positioned at a remote device separate from the robot body; the robot system may comprise a first communication interface carried by the robot body and a second communication interface positioned at the remote device; the at least one non-transitory processor-readable storage medium may include at least one non-transitory processor-readable storage medium positioned at the remote device; the processor-executable instructions or data may cause the first communication interface to send the haptic feedback for the first object, to be received by the second communication interface; the processor-executable instructions or data which cause the robot system to determine the haptic profile of the first object may cause the at least one second processor to determine the haptic profile; and the processor-executable instructions or data which cause the robot system to provide the haptic profile to a database of haptic profiles may cause the remote device to store the determined haptic profile in the database of haptic profiles stored on the at least one non-transitory processor-readable storage medium positioned at the remote device.

The robot system may include at least one visual sensor carried by the robot body; and the processor-executable instructions or data may further cause the robot system to capture, by the at least one visual sensor, visual data representing a first object of the at least one object. The processor executable instructions or data may further cause the robot system to: determine a visual profile of the first object based on the visual data representing the first object; and determine an identification of the first object by matching the determined visual profile to a reference visual profile in a database of visual profiles. The processor executable instructions or data may further cause the robot system to: access a haptic profile corresponding to the first object in a database of haptic profiles, based on the identification of the first object. The processor executable instructions or data may further cause the robot system to: populate the environment model with a haptic representation of the first object based on the accessed haptic profile.

The at least one processor may include at least one processor positioned at the robot body; the processor-executable instructions or data which cause the robot system to determine a visual profile of the first object may cause the at least one processor positioned at the robot body to determine the visual profile of the first object; the processor-executable instructions or data which cause the robot system to determine an identification of the first object may cause the at least one processor positioned at the robot body to determine the identification of the first object; the processor-executable instructions or data which cause the robot system to access a haptic profile corresponding to the first object in a database of haptic profiles may cause the at least one processor positioned at the robot body to access the haptic profile; and the processor-executable instructions or data which cause the robot system to populate the environment model with a haptic representation of the first object may cause the at least one processor positioned at the robot body to populate the environment model. The at least one processor may include at least one first processor carried by the robot body and at least one second processor positioned at a remote device separate from the robot body; the robot system may comprise a first communication interface carried by the robot body and a second communication interface positioned at the remote device; the processor-executable instructions or data which cause the robot system to access, by the at least one processor, an environment model representing an environment, may cause the at least one first processor to access the environment model; the processor-executable instructions or data which cause the robot system to control, by the at least one processor, the robot system may cause the at least one first processor to control the robot system; the processor-executable instructions or data which cause the robot system to determine a visual profile of the first object may cause the at least one first processor to determine the visual profile of the first object; the processor-executable instructions or data may further cause the robot system to send the determined visual profile by the first communication interface, to be received by the second communication interface; the processor-executable instructions or data which cause the robot system to determine an identification of the first object may cause the at least one second processor to determine the identification of the first object; the processor-executable instructions or data which cause the robot system to access a haptic profile corresponding to the first object in a database of haptic profiles may cause the at least one second processor to access the haptic profile; the processor-executable instructions or data may further cause the robot system to send the accessed haptic profile by the second communication interface, to be received by the first communication interface; and the processor-executable instructions or data which cause the robot system to populate the environment model with a haptic representation of the first object may cause the at least one first processor to populate the environment model. The at least one processor may include at least one first processor carried by the robot body and at least one second processor positioned at a remote device separate from the robot body; the robot system may comprise a first communication interface carried by the robot body and a second communication interface positioned at the remote device; the processor-executable instructions or data which cause the robot system to access, by the at least one processor, an environment model representing an environment, may cause the at least one first processor to access the environment model; the processor-executable instructions or data which cause the robot system to control, by the at least one processor, the robot system may cause the at least one first processor to control the robot system; the processor-executable instructions or data may further cause the robot system to send, by the first communication interface, the visual data representing the first object to be received by the second communication interface; the processor-executable instructions or data which cause the robot system to determine a visual profile of the first object may cause the at least one second processor to determine the visual profile of the first object; the processor-executable instructions or data which cause the robot system to determine an identification of the first object may cause the at least one second processor to determine the identification of the first object; the processor-executable instructions or data which cause the robot system to access a haptic profile corresponding to the first object in a database of haptic profiles may cause the at least one second processor to access the haptic profile; and the processor-executable instructions or data which cause the robot system to populate the environment model with a haptic representation of the first object may cause the at least one second processor to populate the environment model.

The processor-executable instructions or data may further cause the robot system to: populate the environment model with a visual representation of the first object based on the determined visual profile. The processor-executable instructions or data may further cause the robot system to: populate the environment model with a visual representation of the first object based on the reference visual profile.

The robot body may comprise at least one locomotion member; the at least one haptic sensor of the robot system may include at least one haptic sensor positioned on the at least one locomotion member; and the processor-executable instructions or data may further cause the robot system to access a haptic profile of a support surface in the environment. The at least one locomotion member may include at least one leg member having a foot member to contact the support surface; and the at least one haptic sensor positioned on the at least one locomotion member may be positioned on a region of the foot member which contacts the support surface. The at least one locomotion member may include at least two leg members, each leg member having a respective foot member to contact the support surface; and the at least one haptic sensor positioned on the at least one locomotion member may include at least two haptic sensors positioned on respective regions of each foot member which contacts the support surface. The processor-executable instructions or data may further cause the robot system to: plan a motion path on the support surface for the robot body based on the haptic profile of the support surface; and execute, by the at least one locomotion member, the motion path on the support surface. The processor-executable instructions or data may further cause the robot system to revise the motion path on the support surface based on haptic feedback captured by the at least one haptic sensor on the at least one locomotion member during execution of the motion path on the support surface. The processor-executable instructions or data may further cause the robot system to: capture, by the at least one haptic sensor, haptic feedback from a region of the support surface on which the at least one locomotion member is positioned; determine a haptic profile of the support surface based on the haptic feedback; and match the determined haptic profile to a reference haptic profile in a database of haptic profiles; and the processor-executable instructions or data which cause the robot system to access a haptic profile of the support surface may cause the robot system to access the reference haptic profile. The robot system may include at least one visual sensor, and the processor-executable instructions or data may further cause the robot system to: capture, by the at least one visual sensor, visual data representing the support surface; determine a visual profile of the support surface based on the visual data representing the support surface; and determine an identification of the support surface by matching the determined visual profile to a reference visual profile in a database of visual profiles; and the processor-executable instructions or data which cause the robot system to access a haptic profile of the support surface may cause the at least one processor to access a haptic profile corresponding to the support surface in a database of haptic profiles based on the identification of the support surface.

The processor-executable instructions or data may further cause the robot system to: touch, with the at least one haptic sensor, at least one object in the environment; activate the at least one haptic sensor in response to touching the at least one object; capture, by the at least one haptic sensor, haptic data of the at least one object in response to activation of the at least one haptic sensor.

The haptic data included in the environmental model may be used by the at least one processor prior to the at least one processor processing feedback from the at least one haptic sensor.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

The following description sets forth specific details in order to illustrate and provide an understanding of the various implementations and embodiments of the present robots, robot systems, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present robots, robot systems, and methods.

Figure 1:
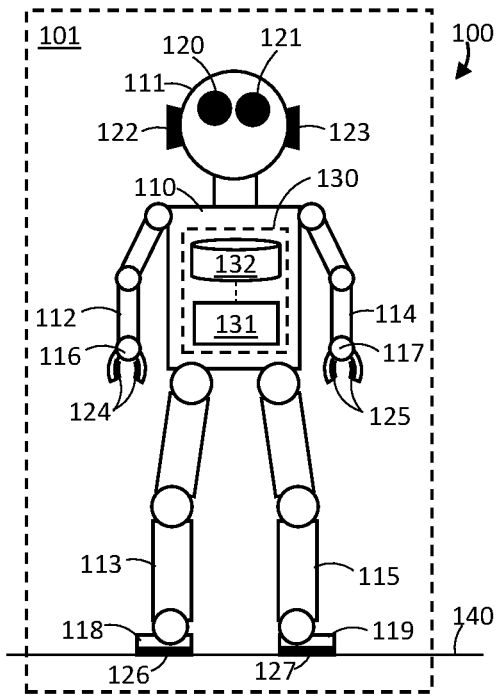
FIGS. 1, 2, and 3 are illustrative diagrams of exemplary robot systems comprising various features and components described throughout the present robots, robot systems, and methods.

FIG. 1 is a front view of an exemplary robot system 100 in accordance with one implementation. In the illustrated example, robot system 100 includes a robot body 101 that is designed to approximate human anatomy, including a torso 110 coupled to a plurality of components including head 111, right arm 112, right leg 113, left arm 114, left leg 115, right end-effector 116, left end-effector 117, right foot 118, and left foot 119, which approximate anatomical features. More or fewer anatomical features could be included as appropriate for a given application. Further, how closely a robot approximates human anatomy can also be selected as appropriate for a given application.

Each of components 110, 111, 112, 113, 114, 115, 116, 117, 118, and 119 can be actuatable relative to other components. Any of these components which is actuatable relative to other components can be called an actuatable member. Actuators, motors, or other movement devices can couple together actuatable components. Driving said actuators, motors, or other movement driving mechanism causes actuation of the actuatable components. For example, rigid limbs in a humanoid robot can be coupled by motorized joints, where actuation of the rigid limbs is achieved by driving movement in the motorized joints.

Figure 4A:
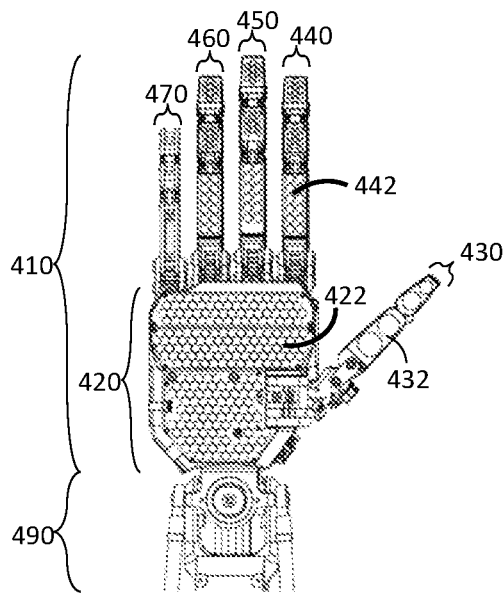
FIGS. 4A, 4B, and 4C are views of a hand-shaped member having tactile or haptic sensors thereon.
Figure 4B:
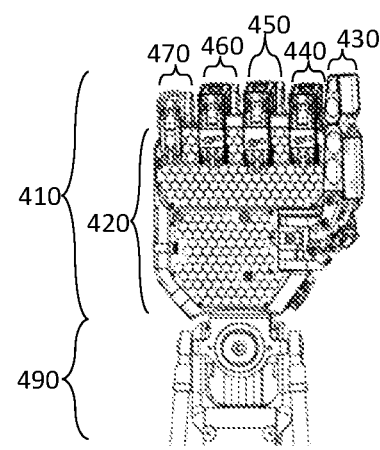
Figure 4C:
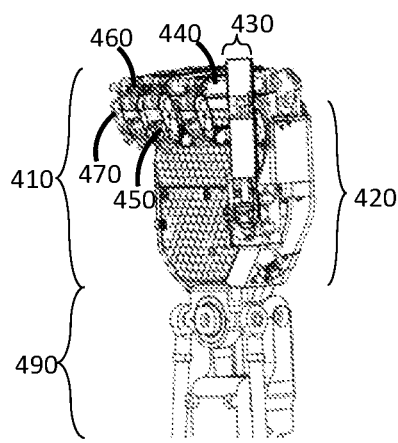

End effectors 116 and 117 are shown in FIG. 1 as grippers, but any end effector could be used as appropriate for a given application. FIGS. 4A, 4B, and 4C illustrate an exemplary case where the end effectors can be hand-shaped members.

Figure 2:
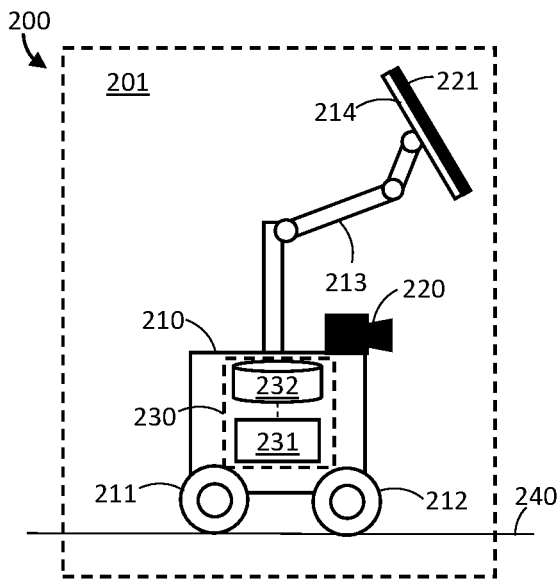
Figure 5A:
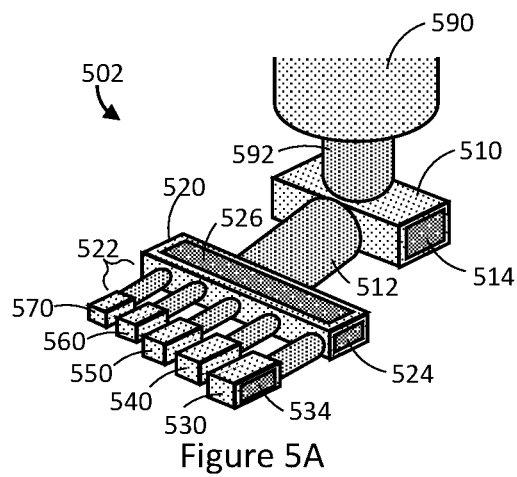
FIGS. 5A and 5B are views of a foot-shaped member having tactile or haptic sensors thereon.
Figure 5B:
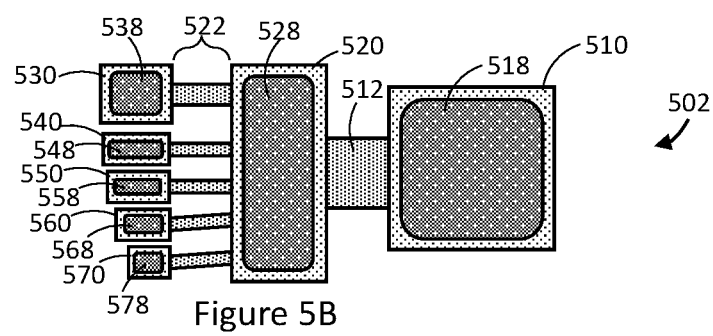

Right leg 113 and right foot 118 can together be considered as a support member and/or a locomotion member, in that the leg 113 and foot 118 together can support robot body 101 in place, or can move in order to move robot body 101 in an environment (i.e. cause robot body 101 to engage in locomotion). Left leg 115 and left foot 119 can similarly be considered as a support member and/or a locomotion member. Legs 113 and 115, and feet 118 and 119 are exemplary support and/or locomotion members, and could be substituted with any support members or locomotion members as appropriate for a given application. For example, FIG. 2 illustrates wheels as exemplary locomotion members instead of legs and feet. Further, although FIG. 1 illustrates robot body 101 as having two legs with respective feet, any appropriate number of legs and feet could be used (e.g. one leg with a foot at the end, or four legs, etc.). Further, it is not necessary for a foot to be positioned at the end of a leg. For example, a leg could contact a support surface directly (e.g. the leg could have a "stump" end), or a leg could have balancing members which protrude therefrom to contact to the support surface 140. FIGS. 5A and 5B discussed later show a foot as included in locomotion members in more detail.

Robot body 101 is shown as being supported by (in the illustrated example, standing on) support surface 140. Support surface 140 can be any appropriate surface which can support robot body 101 in an environment, whether natural or manmade, such as ground, floor, deck, cement, pavement, or any other surface. Robot body 101 is not required to be supported by support surface 140 at all times (or in some cases at all). For example, robot body 101 could jump, and thereby not be supported by support surface 140 temporarily. In another example, robot body 101 could hang from a feature of an environment, such as an overhead rail. In yet another example, robot body 101 could be equipped with flying hardware such as rotor blades, or any other appropriate device.

Robot system 100 in FIG. 1 includes a robot body 101 that closely approximates human anatomy, such that input to or control of robot system 100 can be provided by an operator performing an action, to be replicated by the robot body 101 (e.g. via a tele-operation suit or equipment). In some implementations, it is possible to even more closely approximate human anatomy, such as by inclusion of actuatable components in a face on the head 111 of robot body 101, or with more detailed design of hands or feet of robot body 101, as non-limiting examples. However, in other implementations a complete approximation of the human anatomy is not required, and a robot body may only approximate a portion of human anatomy. As non-limiting examples, only an arm of human anatomy, only a head or face of human anatomy; or only a leg of human anatomy could be approximated.

Robot system 100 also includes sensors 120, 121, 122, 123, 124, 125, 126, and 127 which collect context data representing an environment of robot body 101. In the example, sensors 120 and 121 are image sensors (e.g.

cameras) that capture visual data representing an environment of robot body 101. Although two image sensors 120 and 121 are illustrated, more or fewer image sensors could be included. Also in the example, sensors 122 and 123 are audio sensors (e.g. microphones) that capture audio data representing an environment of robot body 101. Although two audio sensors 122 and 123 are illustrated, more or fewer audio sensors could be included. In the example, haptic (tactile) sensors 124 are included on end effector 116, and haptic (tactile) sensors 125 are included on end effector 117. Haptic sensors 124 and 125 can capture haptic data (or tactile data) when objects in an environment are toughed or grasped by end effectors 116 or 117. In the example, at least one haptic (tactile) sensor 126 is included on foot 118, and at least one haptic (tactile) sensor 127 is included on foot 119. Haptic sensors 126 and 127 can capture haptic data when robot body 101 stands on or moves across support surface 140. Haptic or tactile sensors could also be included on other areas or surfaces of robot body 101. Three types of sensors are illustrated in the example of FIG. 1, though more or fewer sensor types could be included. For example, audio sensors may not be included. As another example, other sensor types, such as accelerometers, inertial sensors, gyroscopes, temperature sensors, humidity sensors, pressure sensor, radiation sensors, or any other appropriate types of sensors could be included. Further, although sensors 120 and 121 are shown as approximating human eyes, and sensors 122 and 123 are shown as approximating human ears, sensors 120, 121, 122, and 123 could be positioned in any appropriate locations and have any appropriate shape.

Throughout this disclosure, reference is commonly made to "haptic" sensors, "haptic" feedback, and "haptic" data. Herein, "haptic" is intended to encompass all forms of touch, physical contact, or feedback. This can include (and be limited to, if appropriate) "tactile" concepts, such as texture or feel as can be measured by a tactile sensor. "Haptic" can also include (and be limited to, if appropriate), force-related aspects of touch, such as force-feedback, resilience, or weight of an element, as could be measured by torque or force sensor of an actuatable member which causes touching of the element. "Haptic" can also include (and be limited to, if appropriate) "proprioceptive" aspects of touch, such as kinesthesia, motion, rotation, or inertial effects experienced when a member of a robot touches an element, as can be measured by sensors such as an inertial measurement unit (IMU), an accelerometer, a gyroscope, or any other appropriate sensor.

Robot system 100 is also illustrated as including at least one processor 131, communicatively coupled to at least one non-transitory processor-readable storage medium 132. The at least one processor 131 can control actuation of components 110, 111, 112, 113, 114, 115, 116, 117, 118, and 119; can receive and process data from sensors 120, 121, 122, 123, 124, 125, 126, and 127; can determine context of the robot body 101, and can access, construct, or refine an environment model, among other possibilities. The at least one non-transitory processor-readable storage medium 132 can have processor-executable instructions stored thereon, which when executed by the at least one processor 131 can cause robot system 100 to perform any of the methods discussed herein. Further, the at least one non-transitory processor-readable storage medium 132 can store sensor data, classifiers, or any other data as appropriate for a given application. Further still, the at least one non-transitory processor-readable storage medium 132 can store environment models, such as those discussed later with reference to FIGS. 7, 8, 9, 10, 11, 12, 13, and 14. The at least one processor 131 and the at least one processor-readable storage medium 132 together can be considered as components of a "robot controller" 130, in that they control operation of robot system 100 in some capacity. While the at least one processor 131 and the at least one processor-readable storage medium 132 can perform all of the respective functions described in this paragraph, this is not necessarily the case, and the "robot controller" 130 can be or further include components that are remote from robot body 101. In particular, certain functions can be performed by at least one processor or at least one non-transitory processor-readable storage medium remote from robot body 101, as discussed later with reference to FIG. 3.

In some implementations, it is possible for a robot body to not approximate human anatomy. FIG. 2 is an elevated side view of a robot system 200 including a robot body 201 which does not approximate human anatomy. Robot body 201 includes a base 210, having actuatable components 211, 212, 213, and 214 coupled thereto. In the example, actuatable components 211 and 212 are wheels (locomotion members) which support robot body 201 on support surface 240 (which is similar to support surface 140 discussed above), and provide movement or locomotion capabilities to the robot body 201. Actuatable components 213 and 214 are a support arm and a haptic data gathering member, respectively. In other examples, other actuatable components could be included.

Robot system 200 also includes sensor 220, which is illustrated as an image sensor. Robot system 200 also includes a haptic sensor 221 positioned on haptic data gathering member 214. The description pertaining to sensors 120, 121, 122, 123, 124, 125, 126, and 127 in FIG. 1 is also applicable to sensors 220 and 221 in FIG. 2 (and is applicable to inclusion of sensors in robot bodies in general). Haptic data gathering member 214 can be used to touch objects in an environment in or to construct, populate, or refine an environment model which includes haptic data for objects. Haptic data gathering member 214 is illustrated as a flat element, but in practice could take any form as appropriate for a given application. For example, haptic data gathering member 214 could be shaped as any appropriate end effector, such as a gripper, at least one finger, at least one probe, or a hand. Further, any number of haptic data gathering members could be included in robot system 200 as appropriate for a given application or implementation. As an example, at least one haptic sensor could be positioned on wheels 211 or 212, or related elements like axels, to capture haptic data or feedback relating the support surface 240.

Robot system 200 is also illustrated as including a local or on-board robot controller 230 comprising at least one processor 231 communicatively coupled to at least one non-transitory processor-readable storage medium 232. The at least one processor 231 can control actuation of components 210, 211, 212, 213, and 214; can receive and process data from sensors 220 and 221; and can determine context of the robot body 201 and can access, construct, or refine an environment model, among other possibilities. The at least one non-transitory processor-readable storage medium 232 can store processor-executable instructions that, when executed by the at least one processor 231, can cause robot body 201 to perform any of the methods discussed herein. Further, the at least one processor-readable storage medium 232 can store sensor data, classifiers, or any other data as appropriate for a given application. Further still, the at least one non-transitory processor-readable storage medium 232 can store environment models, such as those discussed later with reference to FIGS. 7, 8, 9, 11, 12, 13, and 14.

Figure 3:
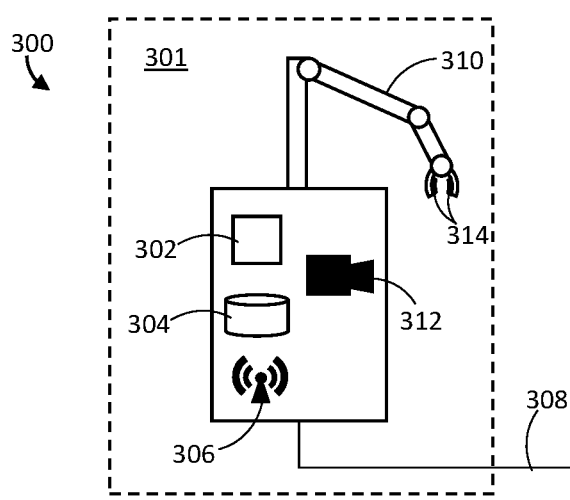
Figure 3:
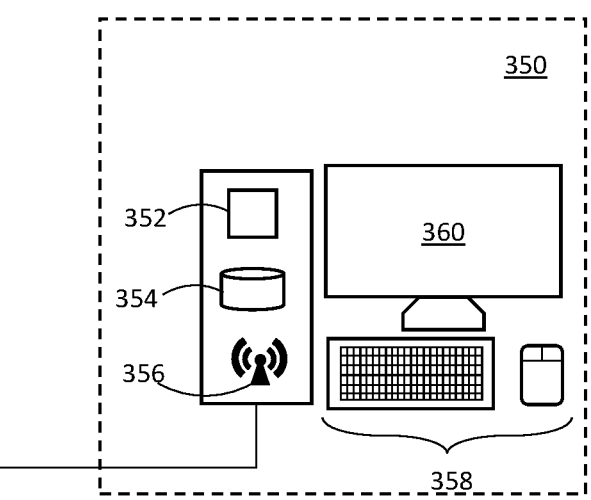

FIG. 3 is a schematic diagram illustrating components of a robot system 300 comprising a robot body 301 and a physically separate remote device 350 in accordance with the present robots and methods.

Robot body 301 is shown as including at least one local or on-board processor 302, a non-transitory processor-readable storage medium 304 communicatively coupled to the at least one processor 302, a wireless communication interface 306, a wired communication interface 308, at least one actuatable component 310, at least one sensor 312, and at least one haptic sensor 314. However, certain components could be omitted or substituted, or elements could be added, as appropriate for a given application. As an example, in many implementations only one communication interface is needed, so robot body 301 may include only one of wireless communication interface 306 or wired communication interface 308. Further, any appropriate structure of at least one actuatable portion could be implemented as the actuatable component 310 (such as those shown in FIGS. 1 and 2, for example). For example, robot body 101 as described with reference to FIG. 1, or robot body 201 described with reference to FIG. 2, could be used in place of robot body 301, and communication interface 306 or communication interface 308 could be implemented therein to enable communication with remote device 350. Further still, the at least one sensor 312 and the at least one haptic sensor 314 can include any appropriate quantity or type of sensor, as discussed with reference to FIGS. 1 and 2.

Remote device 350 is shown as including at least one processor 352, at least one non-transitory processor-readable medium 354, a wireless communication interface 356, a wired communication interface 308, at least one input device 358, and an output device 360. However, certain components could be omitted or substituted, or elements could be added, as appropriate for a given application. As an example, in many implementations only one communication interface is needed, so remote device 350 may include only one of wireless communication interface 356 or wired communication interface 308. As another example, input device 358 can receive input from an operator of remote device 350, and output device 360 can provide information to the operator, but these components are not essential in all implementations. For example, remote device 350 can be a server which communicates with robot body 301, but does not require operator interaction to function. Additionally, output device 360 is illustrated as a display, but other output devices are possible, such as speakers, as a non-limiting example. Similarly, the at least one input device 358 is illustrated as a keyboard and mouse, but other input devices are possible.

In some implementations, the at least one processor 302 and the at least one processor-readable storage medium 304 together can be considered as a "robot controller", which controls operation of robot body 301. In other implementations, the at least one processor 352 and the at least one processor-readable storage medium 354 together can be considered as a "robot controller" which controls operation of robot body 301 remotely. In yet other implementations, that at least one processor 302, the at least one processor 352, the at least one non-transitory processor-readable storage medium 304, and the at least one processor-readable storage medium 354 together can be considered as a "robot controller" (distributed across multiple devices) which controls operation of robot body 301. "Controls operation of robot body 301" refers to the robot controller's ability to provide instructions for operation of the robot body 301 to the robot body 301. In some implementations, such instructions could be explicit instructions which control specific actions of the robot body 301. In other implementations, such instructions could include broader instructions which instruct the robot body 301 generally, where specific actions of the robot body 301 are controlled by a control unit of the robot body 301 (e.g. the at least one processor 302), which converts the broad instructions to specific action instructions. In some implementations, a single remote device 350 may communicatively link to and at least partially control multiple (i.e., more than one) robot bodies. That is, a single remote device 350 may serve as (at least a portion of) the respective robot controller for multiple physically separate robot bodies 301.

Throughout this disclosure, reference is made to controlling robot bodies. Such control can involve mechanical or physical manipulation of the robot body, such as moving at least one actuatable member, end-effector, or locomotion member of the robot body. Alternatively, such control may not involve mechanical or physical manipulation of a robot body, but instead can involve causing the robot to perform cognitive actions such as data processing or observation. In some cases, controlling a robot body can involve both mechanical or physical manipulation of the robot body and cognitive actions.

FIGS. 4A, 4B, and 4C illustrate an exemplary end effector 410 coupled to a member 490 of a robot body. Member 490 could be, for example, an arm of robot body 101, 201, or 301 in FIG. 1, 2, or 3. As a specific example, member 490 could correspond to arm 112 or arm 114 in robot body 101 in FIG. 1. In the illustrated example, end effector 410 is hand-shaped, to grasp, grip, handle, manipulate, touch, or release objects similar to how a human hand would. In the illustrated example, end effector 410 includes finger-shaped members 430, 440, 450, 460, and 470. Although five finger-shaped members are illustrated, any number of finger-shaped members could be included as appropriate for a given application. Each of finger-shaped members 430, 440, 450, 460, and 470 are coupled to a palm-shaped member 420. Palm-shaped member 420 serves as a common member to which the finger-shaped members are coupled. In the example, each of finger-shaped members 430, 440, 450, 460, and 470 are actuatable relative to the palm-shaped member 420 at a respective joint. The finger-shaped members can also include joints at which sub-members of a given finger-shaped member are actuatable. A finger-shaped member can include any number of sub-members and joints, as appropriate for a given application.

In some implementations, the end effectors and/or hands described herein, including but not limited to hand 410, may incorporate any or all of the teachings described in U.S. patent application Ser. No. 17/491,577, U.S. patent application Ser. No. 17/749,536, and/or U.S. Provisional Patent Application Ser. No. 63/342,414, each of which is incorporated herein by reference in its entirety.

Although joints are not explicitly labelled in FIGS. 4A, 4B, and 4C to avoid clutter, the location of such joints can be understood based on the different poses of end-effector 410 shown in FIGS. 4A, 4B, and 4C. FIG. 4A is a front-view which illustrates end effector 410 in an open configuration, with finger-shaped members 430, 440, 450, 460, and 470 extended from palm-shaped member 420 (for example to receive or touch an object). FIG. 4B is a front view which illustrates end effector 410 in a closed configuration, with finger-shaped members 430, 440, 450, 460, and 470 closed into palm-shaped member 420 (for example to grasp or grip an object). FIG. 4C is an isometric view which illustrates end effector 410 in the closed configuration as in FIG. 4B.

The closed configuration of FIGS. 4B and 4C can also be called a contracted configuration, in that finger-shaped members 430, 440, 450, 460, and 470 are "contracted" inward relative to each other. The closed configuration can also be referred to as a grasp configuration, used for grasping an object.

Additionally, FIGS. 4A, 4B, and 4C illustrate a plurality of tactile sensors 422, 432, and 442 on respective palm-shaped member 420 and finger-shaped members 430 and 440. Similar tactile sensors are optionally included on finger-shaped members 450 and 460 which are not labelled to avoid clutter. Finger-shaped member 470 is illustrated without tactile sensors thereon, which is indicative that in some implementations a hand-shaped member may be only partially covered by tactile sensors (although full cover by tactile sensors is possible in other implementations). Such tactile sensors can collect tactile data. Further, these "tactile" sensors can also be referred to as "haptic" sensors, in that they collect data relating to touch, which is included in haptic data as discussed earlier.

FIGS. 5A and 5B illustrate an exemplary support and/or locomotion member 502 which can support and/or cause locomotion of a robot body. FIG. 5A is an isometric view of member 502, whereas FIG. 5B is an upwards view of an underside of member 502. In the illustrated example, the member 502 is foot-shaped, to stand, walk, run, jump, or move similarly to how a human foot would against a support surface. In the illustrated example, member 502 includes toe-shaped members 530, 540, 550, 560, and 570. Although five toe-shaped members are illustrated, any number of toe-shaped members could be included as appropriate for a given application. Each of toe-shaped members 530, 540, 550, 560, and 570 are coupled to a transverse member 520 by a respective couple 522. In the illustrated example, transverse member 520 roughly corresponds approximately to a transverse arch area of a human foot (approximately the "ball" of the foot). Transverse member 520 is in turn coupled to heel member 510 (approximately corresponding to the "heel" of a human foot) by couple 512. Heel member 510 is in turn coupled to a leg member 590 by a couple 592. Any or all of the couples 512, 522, or 592 can be actuatable and or movable, such that members 510, 520, 530, 540, 550, 560, 570, and 590 are movable relative to each other. This provides flexibility of motion for member 502, which can aid in balancing and/or movement. Alternatively, member 502 could be constructed as a rigid member, as appropriate for a given application.

Although FIGS. 5A and 5B illustrate a support and/or locomotion member 502 which approximates a human foot, the particular structure illustrated is merely exemplary, and any combination of component members could be implemented instead, as appropriate for a given application. Additionally, a robot body could include more than one support and/or locomotion member such as member 502. As an example, a robot body could include two members 502, which approximate two feet as humans generally have. Even more support and/or locomotion members could be included in a robot body as appropriate, such as four or even more members.

In the illustrated example, leg member 590 could be considered as part of the support and/or locomotion member 502, in that legs are also involved in supporting or causing a robot body to engage in locomotion. In some implementations, however, leg member 590 may be considered as separate from a support and/or locomotion member. As examples, the support and/or locomotion member could be a wheel, wheels, treads, or other such self-contained locomotion structures, in which case leg member 590 isn't necessarily part of "locomotion".

FIGS. 5A and 5B illustrate a plurality of tactile sensors 514, 524, 526, 534, 518, 528, 538, 548, 558, 568, and 578 on respective regions of member 502. Such tactile sensors can collect tactile data. Further, these "tactile" sensors can also be referred to as "haptic" sensors, in that they collect data relating to touch, which is included in haptic data as discussed earlier. Tactile sensor 518 is shown on an underside of heel member 510; tactile sensor 528 is shown on an underside of transverse member 520; tactile sensor 538 is shown on an underside of toe-shaped member 530; tactile sensor 548 is shown on an underside of toe-shaped member 540; tactile sensor 558 is shown on an underside of toe-shaped member 550; tactile sensor 568 is shown on an underside of toe-shaped member 560; and tactile sensor 578 is shown on an underside of toe-shaped member 570. Each of these tactile sensors 518, 528, 538, 548, 558, 568, and 578 collect tactile data from a support surface which member 502 is in contact with (by virtue of a robot body which includes member 502 standing on said support surface). That is, tactile sensors 518, 528, 538, 548, 558, 568, and 578 are well-positioned to collect direct tactile or haptic data against a support surface which a robot body is positioned over. Tactile sensor 514 is shown on a side of heel member 510; tactile sensor 524 is shown on a side of transverse member 520; tactile sensor 526 is shown on a top side of transverse member 520; and tactile sensor 534 is shown on a side of toe-shaped member 530. These tactile sensors 514, 524, 526, and 534 are well-positioned to collect tactile or haptic data regarding elements of a support surface, or elements connected to a support surface, over which a robot body is positioned. As an example, member 502 may sink into a soft support surface such as sand, mud, or snow. In such cases tactile sensors 514, 524, 526, and 534 collect tactile or haptic data regarding portions of the support surface which contact the sides or top of member 502. Similarly, elements connected to or positioned against a support surface may be a source of tactile data for tactile sensors 514, 524, 526, and 534. As examples, plants or grass growing from a support surface may contact tactile sensors 514, 524, 526, and 534; or water which submerges the support surface may contact tactile sensors 514, 524, 526, and 534.

Member 502 is illustrated with many tactile sensors thereon, but all of these tactile sensors are not necessarily required. In an exemplary implementation, tactile sensors 514, 524, 526, and 534 could be omitted, and tactile data may only be collected by tactile sensors 518, 528, 538, 548, 558, 568, and 578 for a support surface directly under member 502. Further, additional tactile sensors could be included on member 502, to collect even more data. Further, the form and shape of the tactile sensors in FIGS. 5A and 5B is not limiting. As one example, although the tactile sensors in FIGS. 5A and 5B are shown as discrete sensor pads, in some implementations a sensor sleeve or "boot" could be equipped over member 502, to provide even more surface area for collection of tactile data. As another example, a flexible sensor pad could be equipped over an entire underside of member 502.

Figure 6A:
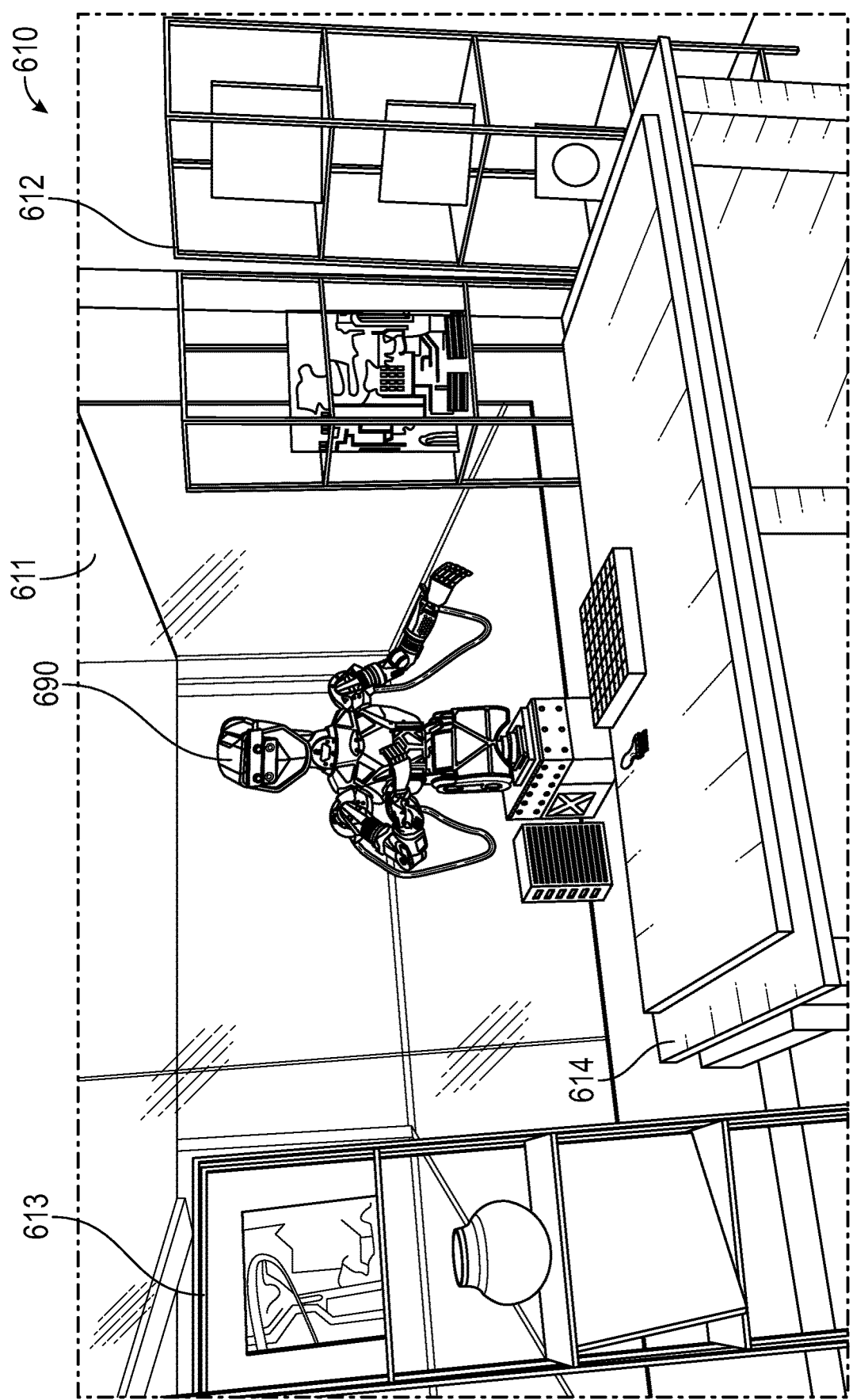
FIG. 6A is a scene view of an environment in which a robot body is positioned.
Figure 6B:
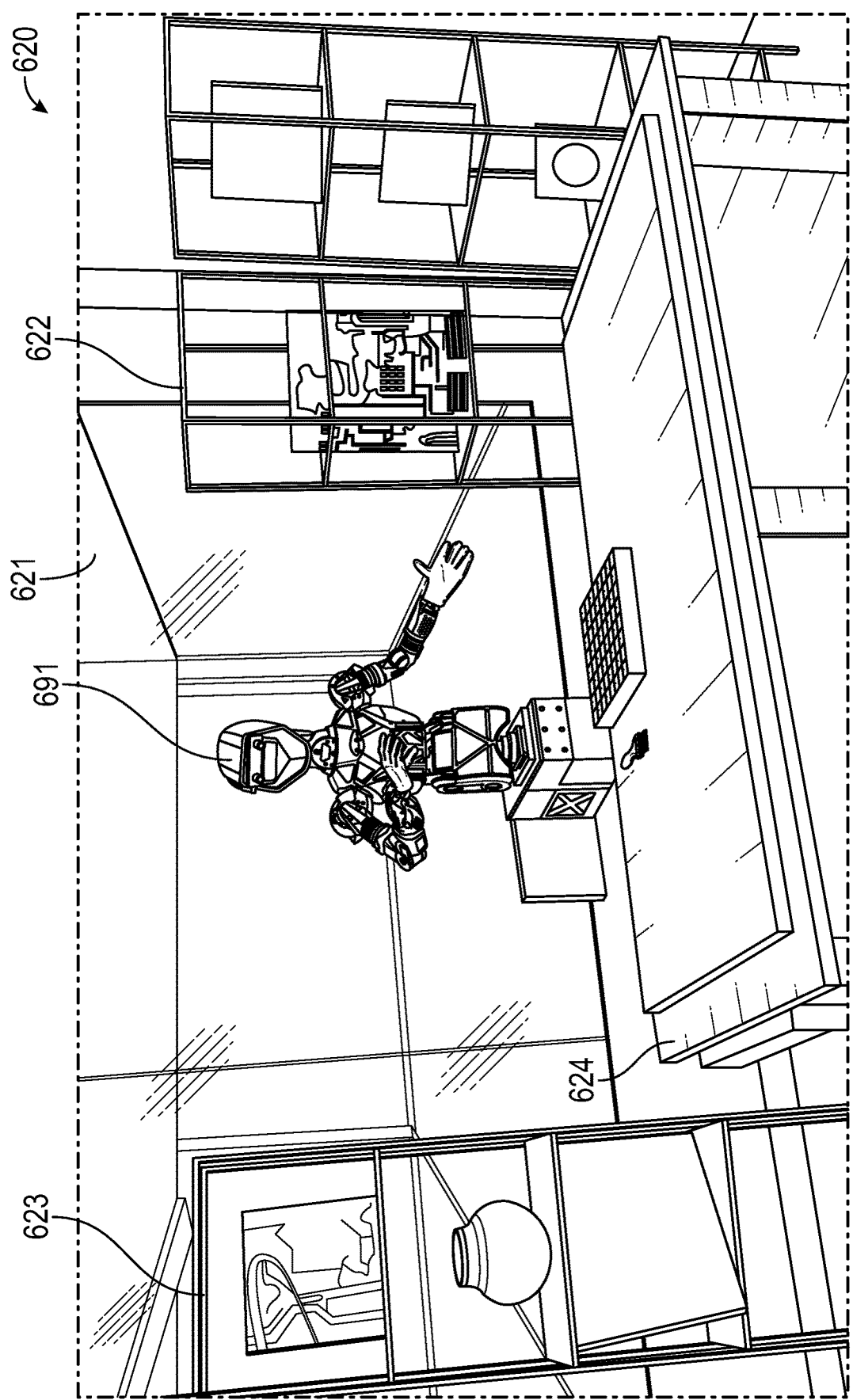
FIG. 6B is a scene view of an environment model which represents the environment shown in FIG. 6A.

FIG. 6A is a scene view which illustrates an exemplary real-world environment 610 in which a real physical robot body 690 is positioned. Environment 610 includes at least display 611 behind robot body 690, shelving units 612 and 613 to the sides of robot body 690, and a table 614 in front of robot body 690. This does not describe every feature or element illustrated in environment 610, but rather describes some prominent features to provide insight into what is shown in FIG. 6A. FIG. 6B is a scene view which illustrates a virtual environment model 620 which represents real-world environment 610 in FIG. 6A. Environment model 620 includes representation 691, which is a virtual model of robot 690 in FIG. 6A. Environment model 620 includes representation 621 of display 611 behind representation 691 of robot body 690, representations 622 and 623 of shelving units 612 and 613 to the sides of representation 691 of robot body 690, and representation 624 of table 614 in front of representation 691 of robot body 690. Environment model 620 can include a visually rendered representation 691 of robot body 690, such that when robot body 690 is operated at least partially based on environment model 620, robot body 690 can be "seen" as representation 691 in environment model 620. Alternatively, environment model 620 can specify representation 691 as a spatial representation of robot body 690 (even if not visually rendered) where elements in the environment model 620 are specified relative to a position of representation 691 of robot 690. In this way representation 691 of robot body 690 may not be visually "seen" as representation 691, but locations of elements relative to the position of representation 691 can still be understood.

FIGS. 6A and 6B visually illustrate an environment model representing an environment, and such a model can be constructed, generated, populated, and/or refined based on visual data (e.g. from at least one image sensor of robot body 690, or from at least one image sensor of another device or robot). Objects, elements, or features in the environment could be represented and stored in an environment model for example based on coordinates and/or size of said objects, elements, or features. However, visual data alone may not provide enough information for a complete understanding of the environment, and thus an environment model based on visual data alone may not be optimal for all tasks a robot body may perform in the environment. As one non-limiting example, based on visual data, the size and structure of shelving units 612 and 613 may be represented in environment model. However, shelving units 612 and 613 are black, and thus based on visual data alone it may be difficult to identify material properties of shelving units 612 and 613. Thus, environment model 620, generated based on visual data alone, may not include information regarding weight or strength of shelving units 612 and 613. Consequently, if robot body 690 tries to interact with shelving units 612 or 613 (e.g. picking them up or placing an object on them), the robot body 690 may not apply appropriate force or balancing measures, and thus may damage, knock over, or apply inadequate force to the shelving units 612 or 613. In some cases, this might be compensated for based on feedback data from haptic sensors included in end effectors of robot body 690, but in other cases it may be too late, and the robot body 690 may have already damaged or knocked over shelving units 612 and 613, or objects thereon, before a robot controller which controls robot body 690 is able to adjust based on the feedback data. It is desirable for an environment model to include or be based on data collected by more than one type of sensor, so that robot body 690 can more accurately and effectively interact with objects, based on determinations made even before interacting with said objects. As an example, an environment model can include haptic profiles of objects in an environment, which can be used by robot body 690 (or a robot system which includes robot body 690) to, e.g., recognize/identify objects and/or determine how to interact with objects in the environment. This is described in detail below.

Figure 7:
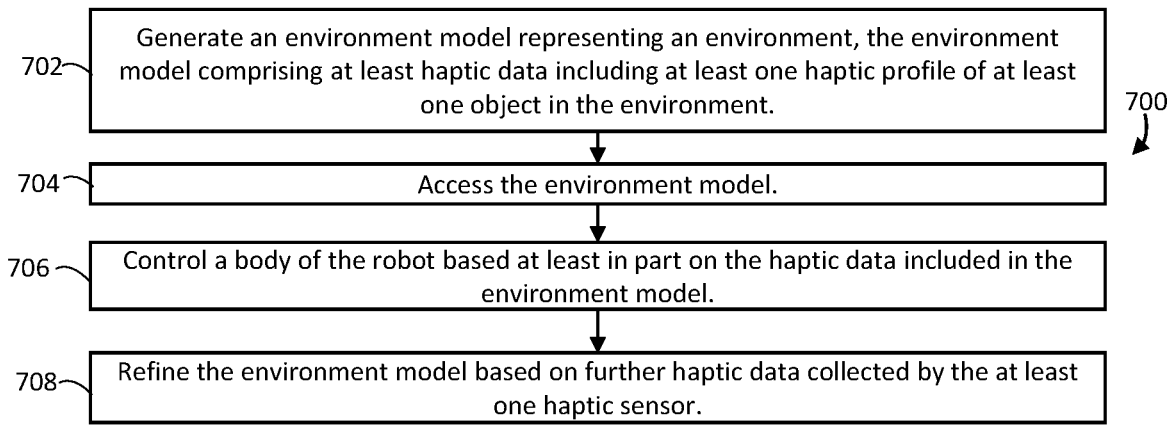
FIG. 7 is a flowchart diagram showing an exemplary method of operation of a robot system, including generation, use, and refinement of an environment model.

FIG. 7 is a flowchart diagram showing an exemplary method 700 of operation of robot system, which includes at least a robot body, and can include another device, for example as discussed above with reference to FIG. 3. In general, throughout this specification and the appended claims, a method of operation of a robot system is a method in which at least some, if not all, of the various acts are performed by components positioned at a robot body of the robot system. For example, certain acts of a method of operation of a robot system may be performed by at least one processor or processing unit (hereafter "processor") positioned at the robot body, and communicatively coupled to a non-transitory processor-readable storage medium positioned at the robot body. In some implementations, certain acts of a method of operation of a robot system may be performed by peripheral components of the robot body that are communicatively coupled to the at least one processor, such as one or more physically actuatable components (e.g., arms, legs, end effectors, grippers, hands), one or more sensors (e.g., optical sensors, audio sensors, tactile sensors, haptic sensors), mobility systems (e.g., wheels, legs), communications and networking hardware (e.g., receivers, transmitters, transceivers), and so on as discussed above with reference to FIGS. 1, 2, and 3. The non-transitory processor-readable storage medium positioned at the robot body may store data (including, e.g., at least one environment model) and/or processor-executable instructions that, when executed by the at least one processor, cause the robot body to perform the method and/or cause the at least one processor to perform those acts of the method that are performed by the at least one processor. The robot body may communicate, via communications and networking hardware communicatively coupled to the robot body's at least one processor, with remote systems and/or remote non-transitory processor-readable storage media, as discussed above with reference to FIG. 3. Thus, unless the specific context requires otherwise, references to a robot system's non-transitory processor-readable storage medium, as well as data and/or processor-executable instructions stored in a non-transitory processor-readable storage medium, are not intended to be limiting as to the physical location of the non-transitory processor-readable storage medium in relation to the at least one processor of the robot body and the rest of the robot hardware. In other words, a robot system's non-transitory processor-readable storage medium may include non-transitory processor-readable storage media located on-board the robot body and/or non-transitory processor-readable storage media located remotely from the robot, unless the specific context requires otherwise. Further, a method of operation of a robot system such as method 700 (or any of the other methods discussed herein) can be implemented as a computer program product. Such a computer program product comprises processor-executable instructions or data that, when the computer program product is stored on a non-transitory processor-readable storage medium of the robot system, and the computer program product is executed by at least one processor of the robot system, the computer program product (or the processor-executable instructions or data thereof) cause the robot system to perform acts of the method.

Returning to FIG. 7, method 700 as illustrated includes four acts 702, 704, 706, and 708, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 702, an environment model representing an environment is generated or constructed. The environment model comprises at least haptic data including at least one haptic profile of at least one object in the environment. The environment model could for example be environment model 620 in FIG. 6B, which represents environment 610. This exemplary illustrated environment model includes visual data, but visual data is not strictly necessary. In one exemplary implementation, generation or construction of the model can be performed by the same robot body or robot system which will perform acts 704, 706, and 708 discussed later. To this end, such a robot system can include at least one haptic sensor which collects haptic data used for generating the environment model. In another exemplary implementation, generation or construction of the model could be performed by a dedicated modelling robot or device, the purpose of which is to enter an environment to collect environmental data with appropriate sensors (including at least one haptic sensor), for the construction or generation of an environment model. In yet another exemplary implementation, generation or construction of the environment model could be performed by a general purpose or non-modelling-dedicated robot, who's purpose is to perform some task in the environment, and while performing said task collects haptic data via at least one haptic sensor, for generation or construction of the model. In each of these implementations, generation or construction of the environment model can be performed by a respective at least one processor included in the robot or device which collects data of the environment. Alternatively, in each of the above implementations, generation or construction of the environment model can be performed by a separate device from a robot which collects data in the environment. For example, any of the aforementioned robots can collect sensor data in the environment, and provide this sensor data to a remote device via a communication interface, which in turn generates the environment model. Specific methods for generating a model are described later with reference to FIGS. 8 and 10.

At 704, a robot system accesses the environment model. For example, the environment model could be stored on a non-transitory processor-readable medium at a robot body, and be accessed by at least one processor of the robot body. As another example, the environment model could be stored remotely from the robot body (e.g. at a server or other remote device), and could be accessed via a communication interface between the robot body and the remote device. As discussed above, sensor data including haptic data can be gathered by another device or another robot body operable in the environment, for generation of the environment model by the another device or another robot body, and the at least one processor of the originally discussed robot body or robot system accesses said environment model.

At 706, the (originally discussed) robot body is controlled based at least in part on the haptic data included in the environment model. Such control could include moving elements of the robot body, such as moving at least one end-effector of the robot body to grasp, move, stabilize, or perform any other appropriate action with any number of objects in the environment. As another example, such control could include cause the robot body to move from one location to another, e.g. to move an object or to get an alternative view on a situation. In some cases as mentioned above, controlling the robot body does not have to involve direct interaction with the environment, or even movement by the robot body. For example, the robot body may be controlled to perform information processing or observation. Additionally, controlling the robot body can be based at least in part on data included in the environment model in addition to the haptic data. For example, as illustrated in environment model 620 in FIG. 6B, the environment model can include visual data representing the environment, the visual data including at least one visual profile of at least one object in the environment. Controlling the robot body as in act 706 can include controlling the robot body based at least in part on such visual data. Further, data included in the environment model (such as haptic data) can be used by at least one processor of the robot system prior to at least one processor of the robot system processing feedback from at least one haptic sensor captured when or after touching an object or feature in the environment. As an example, the robot body can be controlled by at least one processor to pick up or move a delicate object. Prior to even touching the object (and thus prior to receiving haptic feedback upon touching the object), the at least one processor can control the robot body to apply appropriate or precisely controlled motion to avoid damaging the delicate object.

At 708, the environment model is refined based on further haptic data collected by the at least one haptic sensor of the robot body. For example, while interacting with and touching objects in the environment, the at least one haptic sensor of the robot body can collect haptic data, which can be used to refine existing haptic profiles of objects in the environment, or could be used to generate new haptic profiles for objects which do not have a haptic profile in the environment model. Such refining could be performed by at least one processor of the robot system, or could be performed by at least one processor from another device or robot. For example, the robot body in the environment could transmit collected haptic data to a remote device or server, which can refine an environment model stored thereon.

As mentioned above, certain acts of method 700 could be removed or considered optional in some implementations. In one example, a first robot body or a remote device could generate an environment model as in act 702. Subsequently, a second robot body could go into the environment, access the existing environment model as in act 704, and control a body of the second robot as in act 706. In this sense, act 702 is not included in a method for operating the second robot body, since the second robot body does not generate the environment model. In another example, a robot system may not necessarily refine the environment model as in act 708. For example, a robot body of the robot system may not collect sufficient or meaningful data which would be beneficial for refining the model. As another example, the robot system or robot body may lack spare resources for the collection, categorization, or transmission of data which could be used for refining the model, or may lack spare processing resources for refining the model directly.

Figure 8:
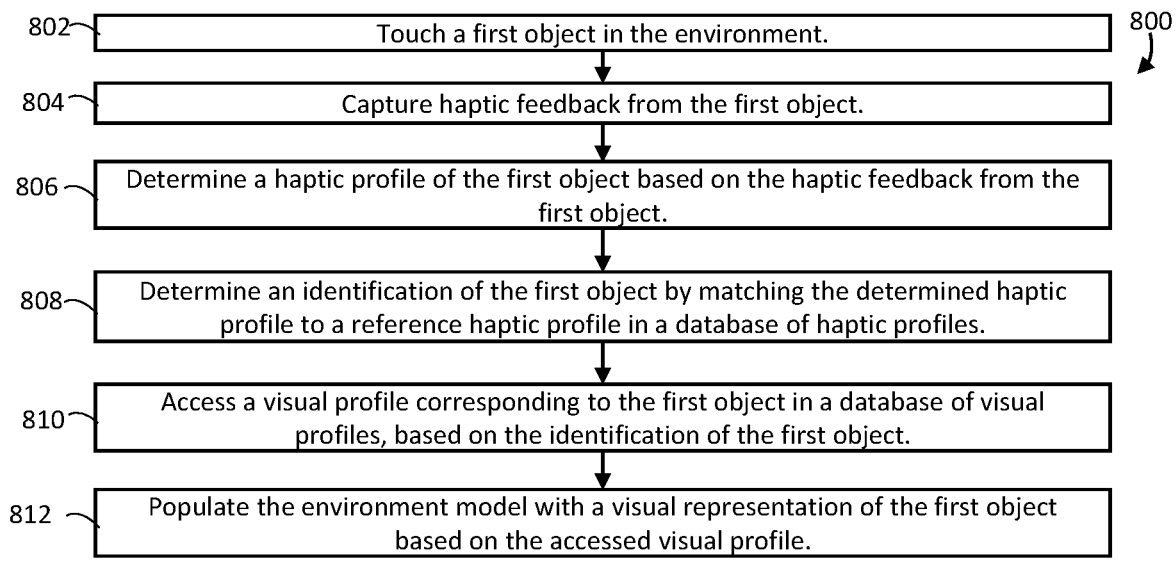
FIG. 8 is a flowchart diagram showing an exemplary method of operation of a robot system to populate an environment model.

FIG. 8 is a flowchart diagram showing an exemplary method 800 of operation of robot system, which includes at least a robot body, and can include another device, similar to as discussed above with reference to FIG. 7. The discussion of FIG. 7 is generally applicable to method 800 in FIG. 8 unless context dictates otherwise. Similar to as discussed with reference to FIG. 7, certain acts of method 800 may be performed by at least one processor or processing unit positioned at the robot body, and communicatively coupled to a non-transitory processor-readable storage medium positioned at the robot body; certain acts of method 800 may be performed by peripheral components of the robot body that are communicatively coupled to the at least one processor; and certain acts of method 800 may be performed by another device remote from the robot body. At least one processor readable medium of a robot system (whether at the robot body, or remote from the robot body) can store processor-executable instructions which, when executed by at least one processor of the robot system, cause the system to perform the acts of method 800.

Method 800 as illustrated includes acts 802, 804, 806, 808, 810, and 812, though those of skill in the art will appreciate that in alternative implementations certain acts may be omitted and/or additional acts may be added. Those of skill in the art will also appreciate that the illustrated order of the acts is shown for exemplary purposes only and may change in alternative implementations. Generally, method 800 is directed to populating an environment model, and can be used in act 702 of method 700 to generate or construct an environment model, or can be used in act 708 of method 700 to refine an environment model.

At 802, a robot body touches a first object in the environment. To this end, the robot body includes at least one actuatable end-effector, such as grippers or a hand-shaped member as discussed with reference to FIGS. 1, 2, 3, 4A, 4B, and 4C. At least one haptic sensor of the robot system includes at least one haptic sensor positioned on a first actuatable end effector of the at least one actuatable end effector. The at least one actuatable end-effector could include more actuatable end-effectors additional to the first actuatable end effector, and the at least one haptic sensor could include additional haptic sensors positioned on any or all of such additional actuatable end effectors. The discussion of method 800 in FIG. 8 generally focuses on the first actuatable end-effector and the haptic sensor or sensors thereon for convenience, but this discussion is applicable to any other end-effectors and haptic sensor arrangements. Further, the discussion of method 800 in FIG. 8 generally focuses on a first object in the environment for convenience, but the discussion is applicable to any object in the environment.

At 804, the at least one haptic sensor on the first end-effector captures haptic feedback or data from the first object. At 806, a haptic profile of the first object is determined based on the haptic feedback from the first object. That is, based on how the first object "feels", a haptic profile of the first object is determined (e.g., shape, hardness, smoothness, protrusions, recess, or any other appropriate features could be identified and compiled as a haptic profile).

At 808, an identification of the first object is determined by matching the determined haptic profile to a reference haptic profile in a database of haptic profiles. For example, each feature of the first object determined in the haptic profile can be compared to respective features in a plurality of reference haptic profiles. Based on at least one similarity metric, a reference haptic profile can be identified which most closely matches the determined haptic profile of the first object. The identified reference haptic profile is paired with an identification of the object represented by the reference haptic profile, and thus the identification of the object in the reference haptic profile is indicative of the identification of the first object. As an example, if the first object is a banana, a determined haptic profile for the banana can be compared to a plurality of reference haptic profiles. Among the plurality of reference haptic profiles can be a reference haptic profile corresponding to a banana, which is labelled, annotated, or otherwise identified as representing a banana. By matching the determined haptic profile for the first object to the banana reference profile, it is determined that the first object is a banana.

Reference haptic profiles can be created based on haptic data from at least one reference object. In the example of a banana reference haptic profile, a plurality of bananas could be grasped, touched, or otherwise handled by at least one haptic sensor (e.g. of a robot, or a haptic sensor array or glove equipped by a human). Haptic data from the plurality of bananas can be unified (e.g. averaged or otherwise statistically compiled) to arrive at a generalized representation of a banana.

At 810, a visual profile corresponding to the first object is accessed in a database of visual profiles, based on the identification of the first object. In the example of a banana, once the first object is identified as a banana, a visual profile (e.g. visual representation, such as a visual model of a banana) is accessed. At 812, the environment model is populated with a visual representation of the first object based on the accessed visual profile. With reference to environment model 620 in FIG. 6B, if robot body 690 touches, grasps, or otherwise handles the first object, which ends up on the table 614 (whether it started there or was placed there by robot body 690), environment model 620 can be populated with a visual representation of the first object on the representation 624 of table 614. In tandem with this, the environment model can be populated with a haptic representation of the first object, based on the determined haptic profile at 806, or based on the reference haptic profile matched at 808.

In some cases, the environment model may not be populated with a determined visual profile. As one example, based on the haptic profile determined at 806, an identification of the first object may not be determined (or may not be determined with sufficient confidence) at 808. As another example, a visual profile may not exist (or may be insufficiently refined) for access at 810. In such cases, the environment model can be populated with the haptic profile determined at 806, or with the reference haptic profile matched at 808, or with a combination of these haptic profiles.

Method 800 provides a useful way to populate an environment model. In some cases, the first object may not be visible to an image sensor of the robot body, or may not be identifiable based on visual data which represents the first object. For example, if the first object is held by an end-effector of a robot body, the end-effector may at least partially occlude the first object, such that the first object cannot be reliably identified based on visual data.

As mentioned above, method 800 in FIG. 8 builds upon method 700 in FIG. 7. For example, method 800 can constitute act 702 of generating the environment model, where the environment model is generated by populating the environment model with as many objects or features as is appropriate using method 800. As another example, method 800 can constitute act 708 of refining the environment model, where additional representations of objects are populated into the environment model, or existing representations of objects are updated or replaced by using method 800.

In the context of method 800, acts 806, 808, 810, and 812 could be performed by different processors of a robot system. Depending on implementation, any of the acts could be performed by at least one processor positioned at a robot body, or by at least one processor positioned at a device remote from the robot body. Three specific possible implementations are discussed below regarding where acts of method 800 are performed, but these implementations are not limiting, and the acts of method 800 could be performed at any device or location as appropriate for a given application.

In a first example, each of acts 806, 808, 810, and 812 are performed by at least one processor positioned at the robot body. In this first example, the environment model, the database of haptic profiles, and the database of visual profiles are at least partially stored at a non-transitory processor-readable storage medium positioned at the robot body. "At least partially stored" in this context describes that the environment model or databases of haptic or visual profiles stored at the robot body may not be complete, but may be limited to objects or areas of the environment the robot body is expected to encounter. For example, an environment model may represent a large region, but the robot body may only be expected to operate in a small portion of this region. Consequently, the environment model stored at the robot body may be limited to the portion in which the robot is expected to operate. Similarly, the databases of profiles stored at the robot body may be limited to objects which reasonably exist in an environment or role in which the robot body is expected to operate in. In some cases, any of the environment model, the database of haptic profiles, and the database of visual profiles can be stored in full at the least one non-transitory processor-readable storage medium at the robot body.

In a second example, method 800 in FIG. 8 builds upon method 700 in FIG. 7 (e.g. method 800 can constitute act 702 of generating the environment model or act 708 of refining the environment model). In this second example, the robot body includes at least one first processor and a first communication interface. A remote device remote from the robot body includes at least one second processor and a second communication interface. In this second example, act 704 of accessing an environment model, and act 706 of controlling the robot system are performed by the at least one first processor (the at least one processor positioned at the robot body). Further, act 806 of determining a haptic profile of the first object is performed by the first at least one processor at the robot body. The determined haptic profile is then sent by the first communication interface of the first robot body, to be received by the second communication interface of the remote device. Act 808 of determining an identification of the first object is then performed by the at least one second processor positioned at the remote device, based on the received haptic profile. Act 810 of accessing a visual profile corresponding to the first object, and act 812 of populating the environment model with a visual representation of the first object are performed by the at least one second processor positioned at the remote device. In this second example, the environment model is stored at a non-transitory processor-readable storage medium of the remote device, which is accessible to the at least one second processor of the remote device. The environment model can be sent by the second communication interface to the first communication interface, for storage on a non-transitory processor-readable storage medium of the robot body, and subsequent access by the at least one first processor of the robot body.

In a third example, method 800 in FIG. 8 builds upon method 700 in FIG. 7 (e.g. method 800 can constitute act 702 of generating the environment model or act 708 of refining the environment model). In this third example, the robot body includes at least one first processor and a first communication interface. A remote device remote from the robot body includes at least one second processor and a second communication interface. In this example, act 704 of accessing an environment model, and act 706 of controlling the robot system are performed by the at least one first processor (the at least one processor positioned at the robot body). Haptic feedback data captured from the first object in act 804 is sent by the first communication interface of the first robot body, to be received by the second communication interface of the remote device. Act 806 of determining a haptic profile of the first object is performed by the at least one second processor at the remote device based on the received haptic feedback data. Act 808 of determining an identification of the first object is performed by the at least one second processor positioned at the remote device. Act 810 of accessing a visual profile corresponding to the first object, and act 812 of populating the environment model with a visual representation of the first object are performed by the at least one second processor positioned at the remote device. In this third example, the environment model is stored at a non-transitory processor-readable storage medium of the remote device, which is accessible to the at least one second processor of the remote device. The environment model can be sent by the second communication interface to the first communication interface, for storage on a non-transitory processor-readable storage medium of the robot body, and subsequent access by the at least one first processor of the robot body.

Figure 9:
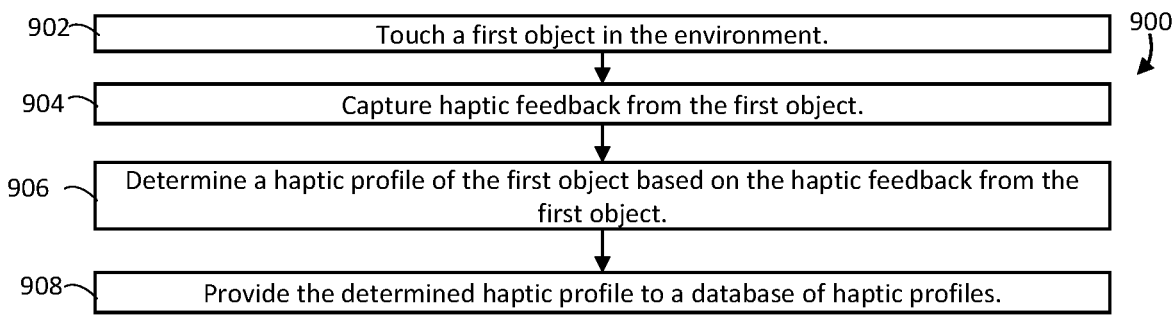
FIG. 9 is a flowchart diagram showing an exemplary method of providing a haptic profile.

FIG. 9 is a flowchart diagram showing an exemplary method 900 of operation of robot system, which includes at least a robot body, and can include another device, similar to as discussed above with reference to FIG. 8. The discussion of FIG. 8 is generally applicable to method 900 in FIG. 9 unless context dictates otherwise. Method 900 as illustrated includes acts 902, 904, 906, and 908, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

Acts 902, 904, and 906 in method 900 are similar to acts 802, 804, and 806, respectively, in method 800. Description of acts 802, 804, and 806 is fully applicable to acts 902, 904, and 906, including where these acts are performed and by what (e.g. at least one processor positioned at a robot body or at a remote device).

At 908, the haptic profile for the first object determined in act 906 is provided to a database of haptic profiles, for inclusion in the database of haptic profiles. For example, the determined haptic profile could be included in the database of haptic profiles for use as a reference profile for future population of environment models. In some implementations, a reference haptic profile in the database of haptic profiles is updated based on the haptic feedback data from the first object and the determined haptic profile therefore. For example, the determined haptic profile of the first object could be combined with existing data for the reference profile (e.g., if the reference profile is a combination or unification of a plurality of haptic profiles of different objects with similar identifications, the determined haptic profile for the first object could be added to the plurality of haptic profiles).

In the context of method 900, acts 902, 904, 906, and 908 could be performed by different elements of a robot system, similar to as discussed with reference to method 800. For example, acts 902 and 904 can be performed by an end-effector and at least one haptic sensor of a robot body, as discussed earlier. Depending on implementation, acts 906 and 908 could be performed by at least one processor positioned at a robot body, or by at least one processor positioned at a device remote from the robot body. Three specific possible implementations are discussed below regarding where acts 906 and 908 are performed, but these implementations are not limiting, and the acts of method 900 could be performed at any device or location as appropriate for a given application.

In a first example, acts 906 and 908 are performed by at least one processor positioned at the robot body. In this first example, the database of haptic profiles is at least partially stored at a non-transitory processor-readable storage medium positioned at the robot body. "At least partially stored" in this context takes the same meaning as discussed earlier. Providing the determined haptic profile to a database of haptic profiles as in act 908 entails the at least one processor positioned at the robot body providing the determined haptic profile to at least one non-transitory processor-readable storage medium positioned at the robot body, for storage and/or incorporation into a database of haptic profiles stored on the at least one non-transitory processor-readable storage medium.

In a second example, act 906 is performed by at least one processor positioned at the robot body as in the first example above. In this second example, the database of haptic profiles is stored at a non-transitory processor-readable storage medium positioned at a remote device remote from the robot body. The robot body includes a communication interface, by which the determined haptic profile is provided to the remote device in act 908, for storage and/or incorporation into the database of haptic profiles stored on at least one non-transitory processor-readable storage medium of the remote device.

In a third example, the robot body includes at least one first processor and a first communication interface; a remote device remote from the robot body includes at least one second processor and a second communication interface. In this example, haptic feedback data captured from the first object in act 904 is sent by the first communication interface of the first robot body, to be received by the second communication interface of the remote device. Act 906 of determining a haptic profile of the first object is performed by the second at least one processor at the remote device based on the received haptic feedback data. Providing the determined haptic profile to a database of haptic profiles as in act 908 can entail the at least one second processor positioned at the remote device providing the determined haptic profile to at least one non-transitory processor-readable storage medium positioned at the remote device, for storage and/or incorporation into a database of haptic profiles stored on the at least one non-transitory processor-readable storage medium. Alternatively, providing the determined haptic profile to a database of haptic profiles as in act 908 can entail the remote device providing the determined haptic profile to another device (e.g. via the second communication interface), for storage and/or incorporation into a database of haptic profiles stored on the another device.

Figure 10:
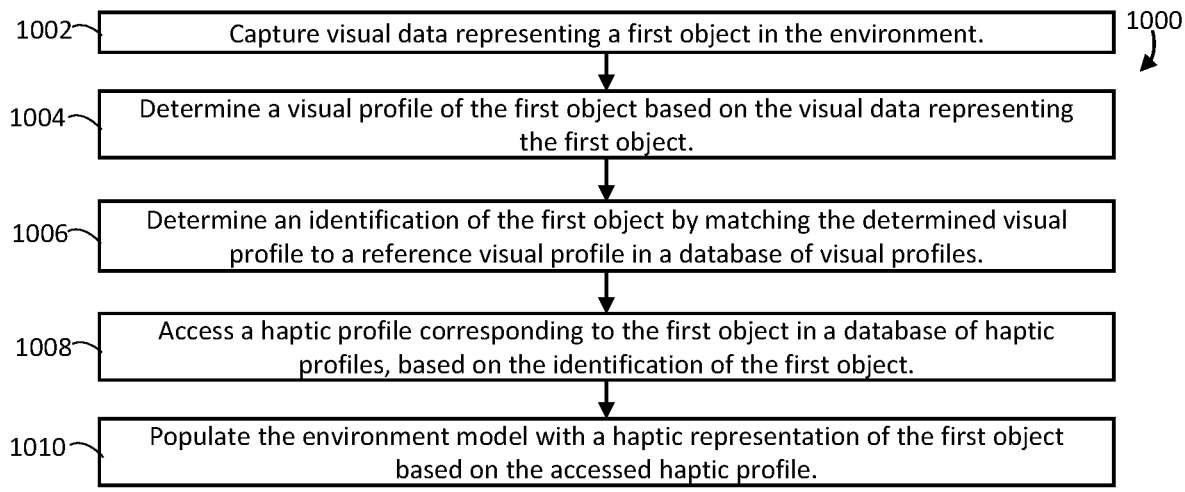
FIG. 10 is a flowchart diagram showing another exemplary method of operation of a robot system to populate an environment model.

FIG. 10 is a flowchart diagram showing an exemplary method 1000 of operation of robot system, which includes at least a robot body, and can include another device, similar to as discussed above with reference to FIG. 7. The discussion of FIG. 7 is generally applicable to method 1000 in FIG. 10 unless context dictates otherwise. Similar to as discussed with reference to FIG. 7, certain acts of method 1000 may be performed by at least one processor or processing unit positioned at the robot body, and communicatively coupled to a non-transitory processor-readable storage medium positioned at the robot body; certain acts of method 1000 may be performed by peripheral components of the robot body that are communicatively coupled to the at least one processor; and certain acts of method 1000 may be performed by another device remote from the robot body. At least one processor readable medium of a robot system (whether at the robot body, or remote from the robot body) can store processor-executable instructions which, when executed by at least one processor of the robot system, cause the system to perform the acts of method 1000.

Method 1000 as illustrated includes acts 1002, 1004, 1006, 1008, and 1010, though those of skill in the art will appreciate that in alternative implementations certain acts may be omitted and/or additional acts may be added. Those of skill in the art will also appreciate that the illustrated order of the acts is shown for exemplary purposes only and may change in alternative implementations. Generally, method 1000 is directed to populating an environment model, and can be used in act 702 of method 700 to generate or construct an environment model, or can be used in act 708 of method 700 to refine an environment model.

At 1002, at least one image sensor of a robot body captures visual data representing a first object in the environment. The discussion of method 1000 in FIG. 10 generally focuses on a first object in the environment for convenience, but the discussion is applicable to any object in the environment.

At 1004, a visual profile of the first object is determined based on the visual data representing the first object. That is, based on how the first object "appears" to the robot, a visual profile of the first object is determined (e.g., shape, color, patterning, reflectiveness, transmissivity, or any other appropriate features could be identified and compiled as a visual profile).

At 1006, an identification of the first object is determined by matching the determined visual profile to a reference visual profile in a database of visual profiles. For example, each feature of the first object determined in the visual profile can be compared to respective features in a plurality of reference visual profiles. Based on at least one similarity metric, a reference visual profile can be identified which most closely matches the determined visual profile of the first object. The identified reference visual profile is paired with an identification of the object represented by the reference visual profile, and thus the identification of the object in the reference visual profile is indicative of the identification of the first object. As an example, if the first object is a banana, a determined visual profile for the banana can be compared to a plurality of reference visual profiles. Among the plurality of reference visual profiles can be a reference visual profile corresponding to a banana, which is labelled, annotated, or otherwise identified as representing a banana. By matching the determined visual profile for the first object to the banana reference visual profile, it is determined that the first object is a banana.

Reference visual profiles can be created based on visual data from at least one reference object. In the example of a banana reference visual profile, a plurality of bananas could be seen, inspected, gazed upon, or otherwise viewed by at least one image sensor (e.g. of a robot, or an image sensor handled by a human). Visual data from the plurality of bananas can be unified (e.g. averaged or otherwise statistically compiled) to arrive at a generalized representation of a banana.

At 1008, a haptic profile corresponding to the first object is accessed in a database of haptic profiles, based on the identification of the first object. In the example of a banana, once the first object is identified as a banana, a haptic profile (e.g. a haptic representation, such as a spatial and haptic properties model of a banana) is accessed. At 1010, the environment model is populated with a haptic representation of the first object based on the accessed haptic profile. With reference to environment model 620 in FIG. 6B, if robot body 690 views the first object, which ends up on the table 614 (whether it started there or was placed there by robot 690 after manipulating the first object for viewing), environment model 620 can be populated with a haptic representation of the first object on the representation 624 of table 614. In tandem with this, the environment model can be populated with a visual representation of the first object, based on the determined visual profile at 1004, or based on the reference visual profile matched at 1006.

In some cases, the environment model may not be populated with a determined haptic profile. As one example, based on the visual profile determined at 1004, an identification of the first object may not be determined (or may not be determined with sufficient confidence) at 1006. As another example, a haptic profile may not exist (or may be insufficiently refined) for access at 1008. In such cases, the environment model can be populated with the visual profile determined at 1004, or with the reference visual profile matched at 1006, or with a combination of these visual profiles.

Method 1000 provides a useful way to populate an environment model. In some cases, the first object may not be touchable by a haptic sensor of the robot body, or it may be desirable to have a haptic understanding of the first object prior to touching the first object.

As mentioned above, method 1000 in FIG. 10 builds upon method 700 in FIG. 7. For example, method 1000 can constitute act 702 of generating the environment model, where the environment model is generated by populating the environment model with as many objects or features as is appropriate using method 1000. As another example, method 1000 can constitute act 708 of refining the environment model, where additional representations of objects are populated into the environment model, or existing representations of objects are updated or replaced by using method 1000.

In the context of method 1000, acts 1004, 1006, 1008, and 1010 could be performed by different processors of a robot system. Depending on implementation, any of the acts could be performed by at least one processor positioned at a robot body, or by at least one processor positioned at a device remote from the robot body. Three specific possible implementations are discussed below regarding where acts of method 1000 are performed, but these implementations are not limiting, and the acts of method 1000 could be performed at any device or location as appropriate for a given application.

In a first example, each of acts 1004, 1006, 1008, and 1010 are performed by at least one processor positioned at the robot body. In this first example, the environment model, the database of haptic profiles, and the database of visual profiles are at least partially stored at a non-transitory processor-readable storage medium positioned at the robot body. "At least partially stored" in this context has the same meaning as described earlier. In some cases, any of the environment model, the database of haptic profiles, and the database of visual profiles can be stored in full at the least one non-transitory processor-readable storage medium at the robot body.

In a second example, method 1000 in FIG. 10 builds upon method 700 in FIG. 7 (e.g. method 1000 can constitute act 702 of generating the environment model or act 708 of refining the environment model). In this second example, the robot body includes at least one first processor and a first communication interface. A remote device remote from the robot body includes at least one second processor and a second communication interface. In this example, act 704 of accessing an environment model, and act 706 of controlling the robot system are performed by the at least one first processor (the at least one processor positioned at the robot body). Further, act 1004 of determining a visual profile of the first object is performed by the first at least one processor at the robot body. The determined visual profile is then sent by the first communication interface of the first robot body, to be received by the second communication interface of the remote device. Act 1006 of determining an identification of the first object is then performed by the at least one second processor positioned at the remote device, based on the received visual profile. Act 1008 of accessing a haptic profile corresponding to the first object, and act 1010 of populating the environment model with a haptic representation of the first object are performed by the at least one second processor positioned at the remote device. In this second example, the environment model is stored at a non-transitory processor-readable storage medium of the remote device, which is accessible to the at least one second processor of the remote device. The environment model can be sent by the second communication interface to the first communication interface, for storage on a non-transitory processor-readable storage medium of the robot body, and subsequent access by the at least one first processor of the robot body.

In a third example, method 1000 in FIG. 10 builds upon method 700 in FIG. 7 (e.g. method 1000 can constitute act 702 of generating the environment model or act 708 of refining the environment model). In this third example, the robot body includes at least one first processor and a first communication interface. A remote device remote from the robot body includes at least one second processor and a second communication interface. In this example, act 704 of accessing an environment model, and act 706 of controlling the robot system are performed by the at least one first processor (the at least one processor positioned at the robot body). Captured visual data representing the first object in act 1002 is sent by the first communication interface of the first robot body, to be received by the second communication interface of the remote device. Act 1004 of determining a visual profile of the first object is performed by the second at least one processor at the remote device based on the received visual data. Act 1006 of determining an identification of the first object is performed by the at least one second processor positioned at the remote device. Act 1008 of accessing a haptic profile corresponding to the first object, and act 1010 of populating the environment model with a haptic representation of the first object are performed by the at least one second processor positioned at the remote device. In this third example, the environment model is stored at a non-transitory processor-readable storage medium of the remote device, which is accessible to the at least one second processor of the remote device. The environment model can be sent by the second communication interface to the first communication interface, for storage on a non-transitory processor-readable storage medium of the robot body, and subsequent access by the at least one first processor of the robot body.

Figure 11:
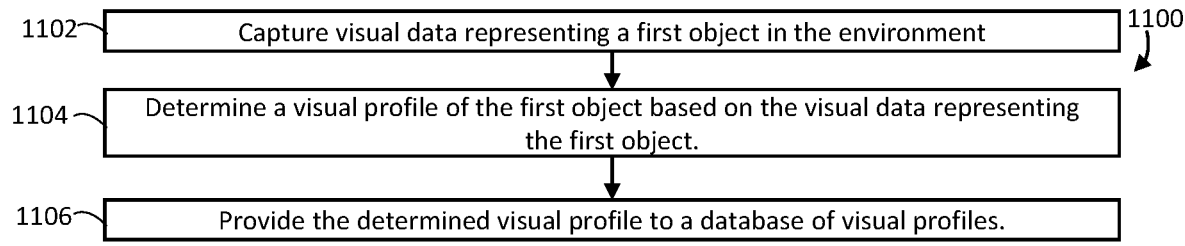
FIG. 11 is a flowchart diagram showing an exemplary method of providing a visual profile.

FIG. 11 is a flowchart diagram showing an exemplary method 1100 of operation of a robot system, which includes at least a robot body, and can include another device, similar to as discussed above with reference to FIG. 10. The discussion of FIG. 10 is generally applicable to method 1100 in FIG. 11 unless context dictates otherwise. Method 1100 as illustrated includes acts 1102, 1104, and 1106, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

Acts 1102 and 1104 in method 1100 are similar to acts 1002 and 1004, respectively, in method 1000. Description of acts 1002 and 1004 is fully applicable to acts 1102 and 1104, including where these acts are performed and by what (e.g. at least one processor positioned at a robot body or at a remote device).

At 1106, the visual profile for the first object determined in act 1104 is provided to a database of visual profiles, for inclusion in the database of visual profiles. For example, the determined visual profile could be included in the database of visual profiles for use as a reference visual profile for future population of environment models. In some implementations, a reference visual profile in the database of visual profiles is updated based on the visual data representing the first object and the determined visual profile therefore. For example, the determined visual profile of the first object could be combined with existing data for the reference visual profile (e.g., if the reference profile is a combination or unification of a plurality of visual profiles of different objects with similar identifications, the determined visual profile for the first object could be added to the plurality of visual profiles).

In the context of method 1100, acts 1102, 1104, and 1106 could be performed by different elements of a robot system, similar to as discussed with reference to method 1000. For example, act 1102 can be performed by at least one image sensor of a robot body, as discussed earlier. Depending on implementation, acts 1104 and 1106 could be performed by at least one processor positioned at a robot body, or by at least one processor positioned at a remote device remote from the robot body. Three specific possible implementations are discussed below regarding where acts 1104 and 1106 are performed, but these implementations are not limiting, and the acts of method 1100 could be performed at any device or location as appropriate for a given application.

In a first example, acts 1104 and 1106 are performed by at least one processor positioned at the robot body. In this example, the database of visual profiles is at least partially stored at a non-transitory processor-readable storage medium positioned at the robot body. "At least partially stored" in this context takes the same meaning as discussed earlier. Providing the determined visual profile to a database of haptic profiles as in act 1106 entails the at least one processor positioned at the robot body providing the determined visual profile to at least one non-transitory processor-readable storage medium positioned at the robot body, for storage and/or incorporation into a database of visual profiles stored on the at least one non-transitory processor-readable storage medium.

In a second example, act 1104 is performed by at least one processor positioned at the robot body as in the first example above. In this second example, the database of visual profiles is stored at a non-transitory processor-readable storage medium positioned at a remote device remote from the robot body. The robot body includes a communication interface, by which the determined visual profile is provided to the remote device in act 1106, for storage and/or incorporation into the database of visual profiles stored on at least one non-transitory processor-readable storage medium of the remote device.

In a third example, the robot body includes at least one first processor and a first communication interface; a remote device remote from the robot body includes at least one second processor and a second communication interface. In this example, visual data representing the first object as captured in act 1102 is sent by the first communication interface of the first robot body, to be received by the second communication interface of the remote device. Act 1104 of determining a visual profile of the first object is performed by the second at least one processor at the remote device based on the received visual data. Providing the determined visual profile to a database of visual profiles as in act 1106 can entail the at least one second processor positioned at the remote device providing the determined visual profile to at least one non-transitory processor-readable storage medium positioned at the remote device, for storage and/or incorporation into a database of visual profiles stored on the at least one non-transitory processor-readable storage medium. Alternatively, providing the determined visual profile to a database of visual profiles as in act 1106 can entail the remote device providing the determined visual profile to another device (e.g. via the second communication interface), for storage and/or incorporation into a database of visual profiles stored on the another device.

Figure 12:
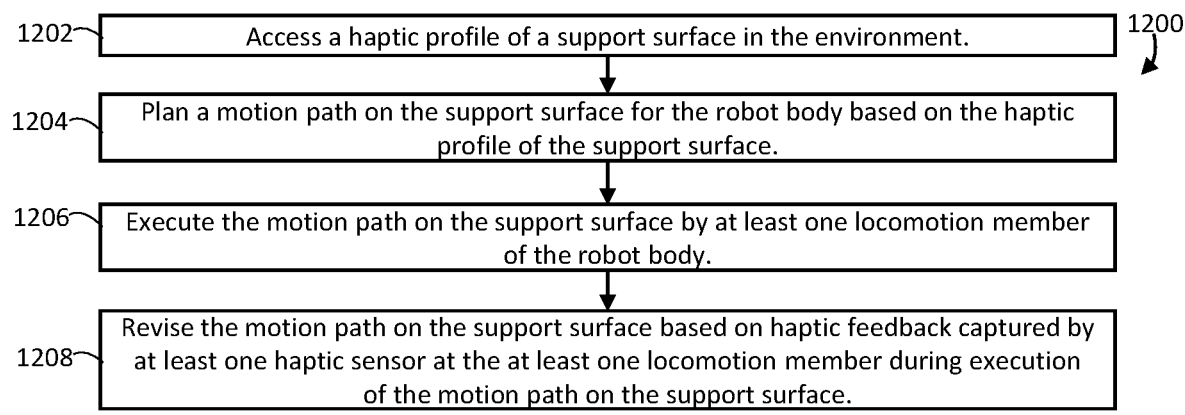
FIG. 12 is a flowchart diagram showing an exemplary method of operation of a robot system, including planning, executing, and revising a motion path of a robot body.

FIG. 12 is a flowchart diagram showing an exemplary method 1200 of operation of robot system, which includes at least a robot, and can include another device, similar to as discussed above with reference to FIG. 7. The discussion of FIG. 7 is generally applicable to method 1200 in FIG. 12 unless context dictates otherwise. Similar to as discussed with reference to FIG. 7, certain acts of method 1200 may be performed by at least one processor or processing unit positioned at the robot body, and communicatively coupled to a non-transitory processor-readable storage medium positioned at the robot body; certain acts of method 1200 may be performed by peripheral components of the robot body that are communicatively coupled to the at least one processor; and certain acts of method 1200 may be performed by another device remote from the robot body. At least one processor readable medium of a robot system (whether at the robot body, or remote from the robot body) can store processor-executable instructions which, when executed by at least one processor of the robot system, cause the system to perform the acts of method 1200.

Method 1200 as illustrated includes acts 1202, 1204, 1206, and 1208, though those of skill in the art will appreciate that in alternative implementations certain acts may be omitted and/or additional acts may be added. Those of skill in the art will also appreciate that the illustrated order of the acts is shown for exemplary purposes only and may change in alternative implementations. Generally, method 1200 is directed to motion of a robot body, and can be used in addition to or complementary to method 700 to operate a robot body relative to an environment.

Method 1200 is applied in a case of a robot body which comprises at least one locomotion member (a member which enables the robot body to engage in locomotion, i.e. movement from one location to another). Such a locomotion member could for example be legs, feet, wheels, conveyors, or any other appropriate member capable of locomotion. Exemplary locomotion members are discussed with reference to FIGS. 1, 2, 5A and 5B above. Further, the robot body includes at least one haptic sensor positioned at the at least one locomotion member. In the case of a plurality of locomotion members, each locomotion member can have a respective at least one haptic sensor positioned thereat. The at least one locomotion member contacts a support surface (such as support surfaces 140 and 240 described with reference to FIGS. 1 and 2), to support the robot body.

In accordance with a specific example, the at least one locomotion member includes at least one leg member having a foot member to contact the support surface. In this example the at least one haptic sensor position on the at least one locomotion member is positioned on a region of the foot member which contacts the support surface. In another specific example, the at least one locomotion member includes at least two leg members, each leg member having a respective foot member to contact the support surface. In this example the at least one haptic sensor positioned on the at least one locomotion member includes at least two haptic sensors each positioned on respective regions of each foot member which contacts the support surface. These specific examples are shown and discussed earlier with reference to FIGS. 1, 5A and 5B.

At 1202, a haptic profile of a support surface in the environment is accessed. Such a haptic profile can be stored in a database of haptic profiles for different support surfaces. Exemplary methods for determining what haptic profile to access are discussed later with reference to FIGS. 13 and 14. The haptic profile can indicate properties of the support surface, such as resilience, texture, roughness, occlusion, or any other properties which can influence movement across the support surface. As examples, a robot body will move differently across a resilient surface like pavement compared to a shifting surface like sand; or a robot body may move more cautiously across an occluded support surface like a loamy forest bed than a predictable surface like concrete. These examples are merely exemplary, and any appropriate nature of surface could be accounted for.

At 1204, a motion path on the support surface is planned. Such a motion path can be based on an origin location (e.g. where the robot body presently is) and a destination location (e.g. where the robot body should be in order to accomplish an objective or perform a task). The motion path can be planned to navigate the robot body from the origin location to the destination location, accounting for the nature of the support surface as indicated in the haptic profile. For example, if the support surface is inconsistent or has obstacles, the motion path can be planned to circumvent such inconsistencies or obstacles, or move in ways which offset the inconsistencies or obstacles. The planned motion path may also include planned movements of the robot which provide optimal movement for the nature of the support surface. For example, for a sandy support surface, the motion path may be planned such that the robot body moves feet thereof at a steep angle, to stab into the sand and provide greater surface area for pushing the robot body against the sand. As another example, for a snowy support surface, the motion path may be planned such that feet of the robot are moved and placed in a flat manner, to maximize surface area against a top of the snow, thereby reducing risk that the robot will sink into the snow or slip.

At 1206, the planned motion path on the support surface is executed by the at least one locomotion member of the robot. That is, the motion path as planned is carried out.

At 1208, optionally, the motion path on the support surface is revised based on haptic feedback captured by at least one haptic sensor at the at least one locomotion member during execution of the motion path on the support surface. That is, once the robot body starts to engage in locomotion, motion of the robot body may be revised or adjusted based on haptic feedback. As an example, the motion path may have been planned for walking across a dry concrete support surface, but upon contacting the concrete support surface, haptic data may indicate that the concrete support surface is in fact wet or not fully cured. The motion path can then be revised to withdraw the robot body from the wet concrete surface, and plan an alternative motion path therearound. As another example, the motion path may have been planned to navigate across a support surface covered in a deep layer of snow, but upon contacting the snow the haptic data may indicate that the snow is a thin layer atop of solid support surface. The motion path may be adjusted to have the robot body navigate more quickly across the solid support surface.

In the context of method 1200, acts 1202, 1204, 1206, and 1208 could be performed by different processors of a robot system. Depending on implementation, any of the acts could be performed by at least one processor positioned at a robot body, or by at least one processor positioned at a device remote from the robot body. Three specific possible implementations are discussed below regarding where acts of method 1200 are performed, but these implementations are not limiting, and the acts of method 1200 could be performed at any device or location as appropriate for a given application.

In a first example, each of acts 1202, 1204, 1206, and 1208 are performed by at least one processor positioned at the robot body. In this example, a database of haptic profiles of support surfaces can be at least partially stored at a non-transitory processor-readable storage medium positioned at the robot body. "At least partially stored" in this context takes the same meaning as discussed earlier. In some cases, the database of haptic profiles of support surfaces can be stored in full at the least one non-transitory processor-readable storage medium at the robot body. The database includes the haptic profile of a support surface accessed in act 1202.

In a second example, the robot body includes at least one first processor and a first communication interface. A remote device remote from the robot body includes at least one second processor and a second communication interface. In this second example, acts 1202, 1204, and 1208 (accessing a haptic profile, planning, and revising a motion path) are performed by the at least one second processor of the remote device, whereas act 1206 (executing the motion path) is performed by the at least one first processor positioned at the robot body and/or at least one locomotion member of the robot body. Sensor data collected at the robot body, which enables identification of an appropriate haptic profile (methods of identification are discussed later with reference to FIGS. 13 and 14), can be sent from the first communication interface to the second communication interface prior to act 1202 of accessing a haptic profile. The motion path planned in act 1204 can be sent from the second communication interface to the first communication interface for execution at the robot body in act 1206. Feedback data (such as haptic data captured by at least one haptic sensor at the robot body), can be sent from the first communication interface to the second communication interface for revision of the motion path at 1208. Subsequently, a revised motion path can be sent from the second interface to the first interface for execution at the robot body.

In a third example, the robot body includes at least one first processor and a first communication interface. A remote device remote from the robot body includes at least one second processor and a second communication interface. In this second example, acts 1202, and 1204 (accessing a haptic profile and planning a motion path) are performed by the at least one second processor of the remote device, whereas acts 1206 and 1208 (executing and revising the motion path) are performed by the at least one first processor positioned at the robot body. Sensor data collected at the robot body, which enables identification of an appropriate haptic profile (methods of identification are discussed later with reference to FIGS. 13 and 14), can be sent from the first communication interface to the second communication interface prior to act 1202 of accessing a haptic profile. The motion path planned in act 1204 can be sent from the second communication interface to the first communication interface for execution at the robot body in act 1206. The at least one first processor positioned at the robot body can revise the motion path as needed based on haptic feedback as in act 1208.

Figure 13:
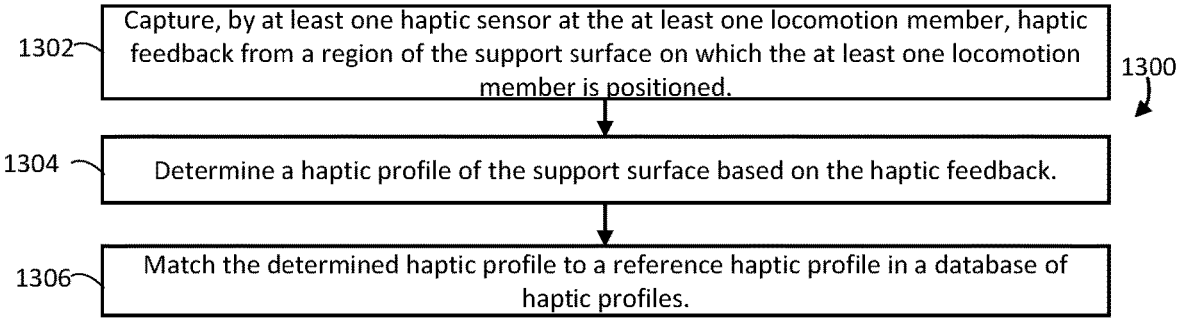
FIGS. 13 and 14 are flowchart diagrams showing exemplary methods of determining a haptic profile of a support surface.
Figure 14:
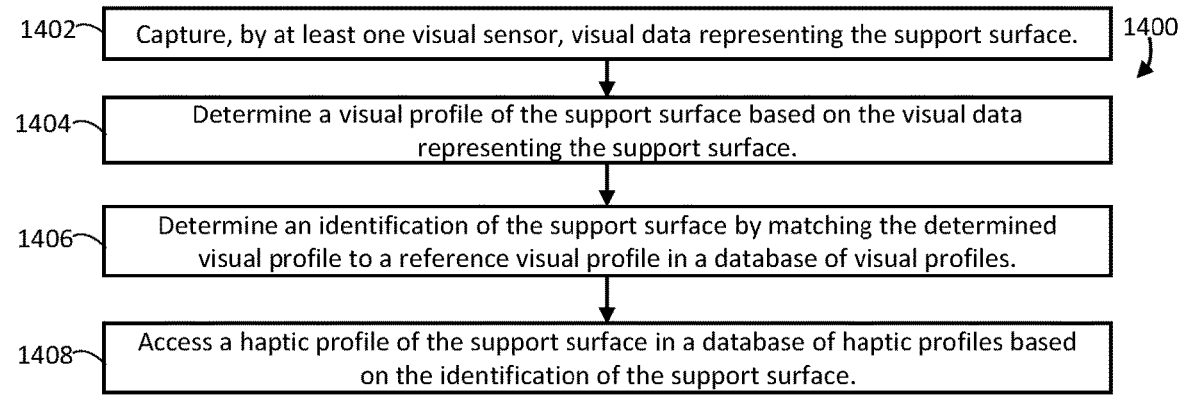

FIGS. 13 and 14 are flowchart diagrams which illustrate respective exemplary methods 1300 and 1400 of operation of robot system, which includes at least a robot body, and can include another device, similar to as discussed above with reference to FIG. 12. Similar to as discussed with reference to FIG. 12, certain acts of methods 1300 and 1400 may be performed by at least one processor or processing unit positioned at the robot body, and communicatively coupled to a non-transitory processor-readable storage medium positioned at the robot body; certain acts of methods 1300 and 1400 may be performed by peripheral components of the robot body that are communicatively coupled to the at least one processor; and certain acts of methods 1300 and 1400 may be performed by another device remote from the robot body. At least one processor readable medium of a robot system (whether at the robot body, or remote from the robot body) can store processor-executable instructions which, when executed by at least one processor of the robot system, cause the system to perform the acts of method 1300 or method 1400. Generally, methods 1300 and 1400 are directed to determining an identification of a support surface, such that an appropriate haptic profile for the support surface can be accessed in act 1202 of method 1200 in FIG. 12.

Method 1300 as illustrated includes acts 1302, 1304, and 1306, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 1302, at least one haptic sensor at a locomotion member of a robot body captures haptic feedback from a region of the support surface on which the at least one locomotion member is positioned. As an example, for a locomotion member which is a leg having a foot at an end thereof, at least one haptic sensor on a sole of the foot can capture haptic data regarding the support surface on which the foot is positioned. At 1304, a haptic profile of the support surface is determined based on the captured haptic feedback. That is, based on how the support surface "feels", a haptic profile of the support surface is determined (e.g., hardness, smoothness, protrusions, recesses, texture or any other appropriate features could be identified and compiled as a haptic profile).

At 1306, an identification of the support surface is determined by matching the determined haptic profile to a reference haptic profile in a database of haptic profiles. For example, each aspect of the support surface determined in the haptic profile can be compared to respective aspects in a plurality of reference haptic profiles. Based on at least one similarity metric, a reference haptic profile can be identified which most closely matches the determined haptic profile of the support surface. The identified reference haptic profile is paired with an identification of the support surface represented by the reference haptic profile, and thus the identification of the reference haptic profile is indicative of the identification of the support surface. The identified reference haptic profile can then be accessed as in act 1202 of method 1200.

Method 1400 as illustrated includes acts 1402, 1404, 1406, and 1408 though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 1402, at least one visual sensor positioned at the robot body captures visual data representing a support surface (the support surface the robot body is positioned on or will be expected to navigate). At 1404, a visual profile of the support surface is determined based on the captured visual data. That is, based on how the support surface "appears", a visual profile of the support surface is determined (e.g. shape, color, patterning, reflectiveness, transmissivity, or any other appropriate features could be identified and compiled as a visual profile).

At 1406, an identification of the support surface is determined by matching the determined visual profile to a reference visual profile in a database of visual profiles. For example, each feature of the support surface determined in the visual profile can be compared to respective features in a plurality of reference visual profiles. Based on at least one similarity metric, a reference visual profile can be identified which most closely matches the determined visual profile of the support surface. The identified reference visual profile is paired with an identification of a support surface represented by the reference visual profile, and thus the identification of the support surface in the reference visual profile is indicative of the identification of the support surface represented in the captured visual data.

At 1408 (which can be implemented in place of, or as a refinement to, act 1202 in method 1200), a haptic profile corresponding to the support surface is accessed in a database of haptic profiles, based on the identification of the support surface.

In the context of methods 1300 and 1400, acts 1304, 1306, 1404, 1406, and 1408 could be performed by different processors of a robot system. Depending on implementation, any of the acts could be performed by at least one processor positioned at a robot body, or by at least one processor positioned at a device remote from the robot body. Two specific possible implementations are discussed below regarding where acts of methods 1300 and/or 1400 are performed, but these implementations are not limiting, and the acts of methods 1300 and/or 1400 could be performed at any device or location as appropriate for a given application. Further, the examples below discuss methods 1300 and 1400 in tandem for convenience; this is does not require that both method 1300 and method 1400 are necessarily performed together in a given application. Each example can be applied only to method 1300, or only to method 1400, or to both method 1300 and method 1400, as is appropriate in a given application.

In a first example, each of acts 1304 and 1306 in method 1300, and/or acts 1404, 1406, and 1408 in method 1400 are performed by at least one processor positioned at the robot body. In this example, a database of haptic profiles and or visual profiles (as needed) of support surfaces can be at least partially stored at a non-transitory processor-readable storage medium positioned at the robot body. "At least partially stored" in this context takes the same meaning as discussed earlier. In some cases, the databases of haptic profiles and or visual profiles of support surfaces can be stored in full at the least one non-transitory processor-readable storage medium at the robot body. The database includes the haptic profile of a support surface accessed in act 1202 and/or 1408.

In a second example, the robot body includes at least one first processor and a first communication interface. A remote device remote from the robot body includes at least one second processor and a second communication interface. In this second example, acts 1302 and/or 1402 (capturing haptic feedback and/or visual data) are performed by at least one appropriate sensor at the robot body, whereas acts 1304, 1306, 1404, 1406, and/or 1408 (determining, matching, and accessing profiles) are performed by the at least one second processor positioned at the remote device. Sensor data collected in acts 1302 or 1402 can be sent from the first communication interface to the second communication interface for use in other acts of method 1300 and/or 1400.

Figure 15:
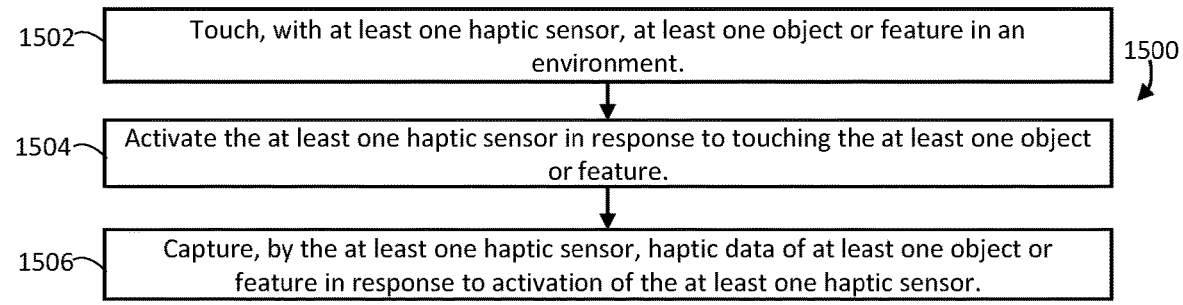
FIG. 15 is a flowchart diagram of controlling a haptic sensor.

FIG. 15 is a flowchart diagram showing an exemplary method 1500 of operation of at least one haptic sensor, which could be implemented within any of the implementations herein which make use of at least one haptic sensor. Method 1500 as illustrated includes acts 1502, 1504, and 1506, though those of skill in the art will appreciate that in alternative implementations certain acts may be omitted and/or additional acts may be added. Those of skill in the art will also appreciate that the illustrated order of the acts is shown for exemplary purposes only and may change in alternative implementations.

At 1502, at least one object or feature in an environment is touched with at least one haptic sensor. Such a haptic sensor could be positioned, for example, on an end-effector or locomotion member of a robot body, as discussed earlier with reference to FIGS. 1, 2, 3, 4A, 4B, 4C, 5A, and 5B. At 1504, in response to touching the at least one object or feature, the at least one haptic sensor is activated. That is, prior to touching the object or feature, the haptic sensor can be deactivated (e.g. in a low-power, sleep, or off mode), and touching the object or feature causes the at least one haptic sensor to be transition to operate in an active mode. Activation of the at least one haptic sensor could be performed by the at least one haptic sensor itself, or could be performed by at least one processor of the robot body or robot system which includes the at least one haptic sensor. At 1506, the at least one haptic sensor captures haptic data of at least one object or feature in response to activation of the at least one haptic sensor. The at least one haptic sensor can capture haptic data of the same object or feature which triggered activation of the at least one haptic sensor, or the at least one haptic sensor can capture haptic data or a different (or additional) object or feature in the environment. Further, haptic data of a plurality of objects or features in the environment can be captured.

The robots described herein may, in some implementations, employ any of the teachings of U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), U.S. Provisional Patent Application Ser. No. 63/001,755 (Publication No. US 2021-0307170 A1), and/or U.S. Provisional Patent Application Ser. No. 63/057,461, as well as U.S. Provisional Patent Application Ser. No. 63/151,044, U.S. Provisional Patent Application Ser. No. 63/173,670, U.S. Provisional Patent Application Ser. No. 63/184,268, U.S. Provisional Patent Application Ser. No. 63/213,385, U.S. Provisional Patent Application Ser. No. 63/232,694, U.S. Provisional Patent Application Ser. No. 63/253,591, U.S. Provisional Patent Application Ser. No. 63/293,968, U.S. Provisional Patent Application Ser. No. 63/293,973, U.S. Provisional Patent Application Ser. No. 63/278,817, and/or U.S. patent application Ser. No. 17/566,589, each of which is incorporated herein by reference in its entirety.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present robots, robot systems and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A robot system comprising:
   at least one processor;
   a first actuatable end effector;
   at least one haptic sensor positioned on the first actuatable end effector;
   at least one non-transitory processor-readable storage medium communicatively coupled to the at least one processor, the at least one non-transitory processor-readable storage medium storing processor-executable instructions or data that, when executed by the at least one processor, cause the robot system to:
      access an environment model representing an environment, the environment model comprising haptic data including at least one haptic profile of at least one object in the environment;
      touch, by the first actuatable end effector, a first object of the at least one object;
      capture, by the at least one haptic sensor positioned on the first actuatable end effector, haptic feedback from the first object;
      determine a haptic profile of the first object based on the haptic feedback from the first object;
      determine an identification of the first object by matching the determined haptic profile to a reference haptic profile in a database of haptic profiles;
      access a visual profile corresponding to the first object in a database of visual profiles, based on the identification of the first object determined by matching the determined haptic profile to a reference haptic profile in a database of haptic profiles; and
      control the robot system based at least in part on the haptic data included in the environment model and based on feedback from the at least one haptic sensor.

2. The robot system of claim 1, wherein the processor executable instructions or data cause the robot system to generate, by the at least one processor, the environment model based at least in part on haptic data collected by the at least one haptic sensor.

3. The robot system of claim 1, wherein:
   the environment model further includes visual data representing the environment, the visual data including at least one visual profile of at least one object in the environment; and
   the processor-executable instructions or data which cause the robot system to control, by the at least one processor, the robot system cause the at least one processor to:
      control the robot system further based at least in part on the visual data included in the environment model.

4. The robot system of claim 1, wherein the processor-executable instructions or data further cause the robot system to: in response to the at least one processor controlling the robot system, refine the environment model based on further haptic data collected by the at least one haptic sensor.

5. The robot system of claim 1 wherein the processor-executable instructions or data further cause the robot system to:
   populate the environment model with a visual representation of the first object based on the accessed visual profile.

6. The robot system of claim 1 wherein the processor-executable instructions or data further cause the robot system to update the reference haptic profile in the database of haptic profiles based on the haptic feedback from the first object.

7. The robot system of claim 1 wherein the processor-executable instructions or data further cause the robot system to:
   populate the environment model with a haptic representation of the first object based on the determined haptic profile.

8. The robot system of claim 1 wherein the processor-executable instructions or data further cause the robot system to:
   populate the environment model with a haptic representation of the first object based on the reference haptic profile.

9. The robot system of claim 1 wherein the processor-executable instructions or data further cause the robot system to provide the determined haptic profile to a database of haptic profiles.

10. The robot system of claim 1 wherein the first actuatable end effector includes a robotic hand.

11. The robot system of claim 1, wherein the haptic data included in the environmental model is used by the at least one processor prior to the at least one processor processing feedback from the at least one haptic sensor.

12. A robot system comprising:
    at least one processor;
    at least one visual sensor;
    at least one non-transitory processor-readable storage medium communicatively coupled to the at least one processor, the at least one non-transitory processor-readable storage medium storing processor-executable instructions or data that, when executed by the at least one processor, cause the robot system to:
       access an environment model representing an environment;
       capture, by the at least one visual sensor, visual data representing a first object in the environment;
       determine a visual profile of the first object based on the visual data representing the first object;
       determine an identification of the first object by matching the determined visual profile to a reference visual profile in a database of visual profiles;

access a haptic profile corresponding to the first object in a database of haptic profiles, based on the identification of the first object determined by matching the determined visual profile to a reference visual profile in a database of visual profiles; and control the robot system based at least in part on the haptic profile corresponding to the first object.

13. The robot system of claim 12, wherein the processor executable instructions or data cause the robot system to generate, by the at least one processor, the environment model based at least in part on visual data collected by the at least one visual sensor.

14. The robot system of claim 13 wherein the processor-executable instructions or data which cause the robot system to control, by the at least one processor, the robot system cause the at least one processor to: control the robot system further based at least in part on the visual data included in the environment model.

15. The robot system of claim 12 wherein the processor executable instructions or data further cause the robot system to:

populate the environment model with a haptic representation of the first object based on the accessed haptic profile.

16. The robot system of claim 12 wherein the processor-executable instructions or data further cause the robot system to:

populate the environment model with a visual representation of the first object based on the determined visual profile.

17. The robot system of claim 12 wherein the processor-executable instructions or data further cause the robot system to:

populate the environment model with a visual representation of the first object based on the reference visual profile.

18. The robot system of claim 12, further comprising:

a first actuatable end effector; and at least one haptic sensor positioned on the first actuatable end effector, wherein the processor-executable instructions or data further cause the robot system to:

touch, with the first actuatable end effector, the first object in the environment; and capture, by the at least one haptic sensor in response to touching the first object, haptic feedback from the first object.

19. The robot system of claim 18 wherein the processor-executable instructions or data further cause the robot system to update the haptic profile corresponding to the first object based on the haptic feedback from the first object.

20. The robot system of claim 18 wherein the first actuatable end effector includes a robotic hand.

* * * * *